United States Patent
Tegnell et al.

(10) Patent No.: US 10,459,413 B2
(45) Date of Patent: Oct. 29, 2019

(54) MULTI-PROTOCOL GATEWAY WITH CONTROL IN A PROCESS CONTROL SYSTEM

(71) Applicant: Schneider Electric Systems USA, Inc., Foxboro, MA (US)

(72) Inventors: Johan I. Tegnell, Mansfield, MA (US); Alan A. Gale, Windham, ME (US); Thomas A. Nery, Mansfield, MA (US); Krishna R. Mendu, Canton, MA (US); Christopher Hu, Foxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 7 days.

(21) Appl. No.: 15/794,746

(22) Filed: Oct. 26, 2017

(65) Prior Publication Data
US 2018/0120796 A1    May 3, 2018

Related U.S. Application Data

(60) Provisional application No. 62/415,217, filed on Oct. 31, 2016.

(51) Int. Cl.
*G05B 15/02* (2006.01)
*G06F 13/42* (2006.01)
(Continued)

(52) U.S. Cl.
CPC ......... *G05B 15/02* (2013.01); *G05B 19/0421* (2013.01); *G06F 13/4282* (2013.01);
(Continued)

(58) Field of Classification Search
None
See application file for complete search history.

(56) References Cited

U.S. PATENT DOCUMENTS

| | | | | |
|---|---|---|---|---|
| 6,553,419 B1 * | 4/2003 | Ram | .................. | G06F 11/3476 709/224 |
| 6,578,158 B1 * | 6/2003 | Deitz | .................. | G06F 11/2092 714/11 |

(Continued)

FOREIGN PATENT DOCUMENTS

| | | |
|---|---|---|
| EP | 2262152 A1 | 12/2010 |
| EP | 2530549 A2 | 12/2012 |

OTHER PUBLICATIONS

Valavanis, "Control Architectures for Autonomous Underwater Vehicles", Dec. 1997, IEEE Control Systems, 0272-1708/97, pp. 57-59 (Year: 1997).*

(Continued)

*Primary Examiner* — Mohammad Ali
*Assistant Examiner* — David Earl Ogg
(74) *Attorney, Agent, or Firm* — Stinson LLP

(57) ABSTRACT

Controlling and communicating with separate sets of industrial process control devices via separate data protocols simultaneously with a single processing device that utilizes redundancy and task-splitting to increase availability. An exemplary system includes a device integrator processor configured to receive and transmit electronic data via a plurality of protocols simultaneously. In one form, the device integrator processor includes a primary module that primarily controls communications and synchronizes itself with a shadow module of the processor. In another form, the processor includes multiple cores that each control a set of devices. Moreover, the cores implement a redundancy scheme.

19 Claims, 15 Drawing Sheets

(51) Int. Cl.
*G05B 19/042* (2006.01)
*G05B 19/418* (2006.01)

(52) U.S. Cl.
CPC .............. *G05B 19/4185* (2013.01); *G05B 2219/24175* (2013.01); *G05B 2219/24186* (2013.01); *G05B 2219/25204* (2013.01); *G05B 2219/33235* (2013.01)

(56) References Cited

U.S. PATENT DOCUMENTS

| | | | |
|---|---|---|---|
| 9,411,769 B2* | 8/2016 | Erni | G05B 19/4185 |
| 2007/0168058 A1* | 7/2007 | Kephart | G05B 9/03 |
| | | | 700/82 |
| 2007/0280287 A1 | 12/2007 | Samudrala et al. | |
| 2008/0189441 A1* | 8/2008 | Jundt | G05B 19/042 |
| | | | 710/3 |
| 2010/0287556 A1* | 11/2010 | Munz | G06F 9/4887 |
| | | | 718/102 |
| 2013/0018484 A1* | 1/2013 | Schultz | G05B 19/05 |
| | | | 700/7 |

OTHER PUBLICATIONS

Extended European Search Report for 17197502.2, dated Feb. 12, 2018 (8 pages).

\* cited by examiner

MULTI-PROTOCOL GATEWAY WITH CONTROL IN A PROCESS CONTROL SYSTEM

CROSS-REFERENCE TO RELATED APPLICATIONS

This application claims priority from U.S. Provisional Patent Application Ser. No. 62/415,217, filed Oct. 31, 2016, entitled "MULTI-PROTOCOL GATEWAY WITH CONTROL IN A PROCESS CONTROL SYSTEM." The entire contents of the above-identified application are expressly incorporated herein by reference, including the contents and teachings of any references contained therein.

FIELD

Aspects of the present disclosure relate of the fields of networked computerized industrial control and automation systems.

BACKGROUND

Such industrial control and automation systems generally comprise process controller devices, which are typically connected via networks to large quantities of field devices throughout a process control system. Field devices in a process come in a variety of types and functionalities and may be created by many different vendor companies. Controlling the huge variety of field devices in concert is a vital task for ensuring the productivity of process control systems.

Typical industrial processes today are extremely complex and involve many intelligent devices such as transmitters, positioners, motor drives, limit switches, and other communication enabled devices. By way of example, it is not unheard of to have thousands of sensors and control elements (e.g., valve actuators) monitoring/controlling aspects of a multi-stage process within an industrial plant. As field devices have become more advanced over time, the process of controlling and synchronizing the field devices has also increased in complexity.

In previous generations of industrial process control equipment, and more particularly field devices, transmitters and positioners were comparatively simple components. Before the introduction of digital (intelligent) transmitters, activities associated with a field device were relatively simple. Industry standards like 3-15 psi for pneumatic instruments or 4-20 ma for electronic instruments allowed a degree of interoperability that minimized setup, configuration, and operation of analog transmitters.

More contemporary field devices that include digital data transmitting capabilities and on-device digital processors, referred to generally as "intelligent" field devices, require significantly more configuration effort when setting up a new field device. Management of complex, intelligent devices requires a variety of different software interfaces, protocols, and drivers to ensure efficient interaction with each type of device.

SUMMARY

Aspects of the present disclosure permit controlling separate sets of devices with a single processing device comprising multiple cores, wherein each core controls a set of devices. Moreover, each core implements a type of redundancy scheme.

In one form, a system for enabling control of devices in a process control system includes at least one first interface, at least one second interface, and a device integrator processor. The first interface is configured to support communication of first electronic data among the devices via at least one electronic data communications network according to a first electronic data communication protocol. The second interface is configured to support communication of second electronic data among the devices via the at least one electronic data communications network according to a second electronic data communication protocol. The device integrator processor includes a primary module and a shadow module. The primary module and the shadow module are each configured to couple to the electronic data communications network via the first and second interfaces. The primary module is configured to receive and transmit the first and second electronic data on the electronic data communications network according to the first and second electronic data communication protocols simultaneously. For example, communicating via the plurality of protocols enables the primary module to control communications on the electronic data communication network during operation of the system.

In another form, a method for enabling control of devices in a process control system is provided. The method includes coupling a primary module of a device integrator processor to an electronic data communications network via at least one first interface and at least one second interface. The first and second interfaces are configured to simultaneously support communication of first electronic data among the devices via the electronic data communications network according to a first electronic data communication protocol and second electronic data among the devices via the electronic data communications network according to a second electronic data communication protocol. The method includes coupling a shadow module of the processor to the electronic data communications network via the first and second interfaces. Furthermore, the method controls communications on the electronic data communications network by the primary module receiving and transmitting the first and second electronic data on the electronic data communications network.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
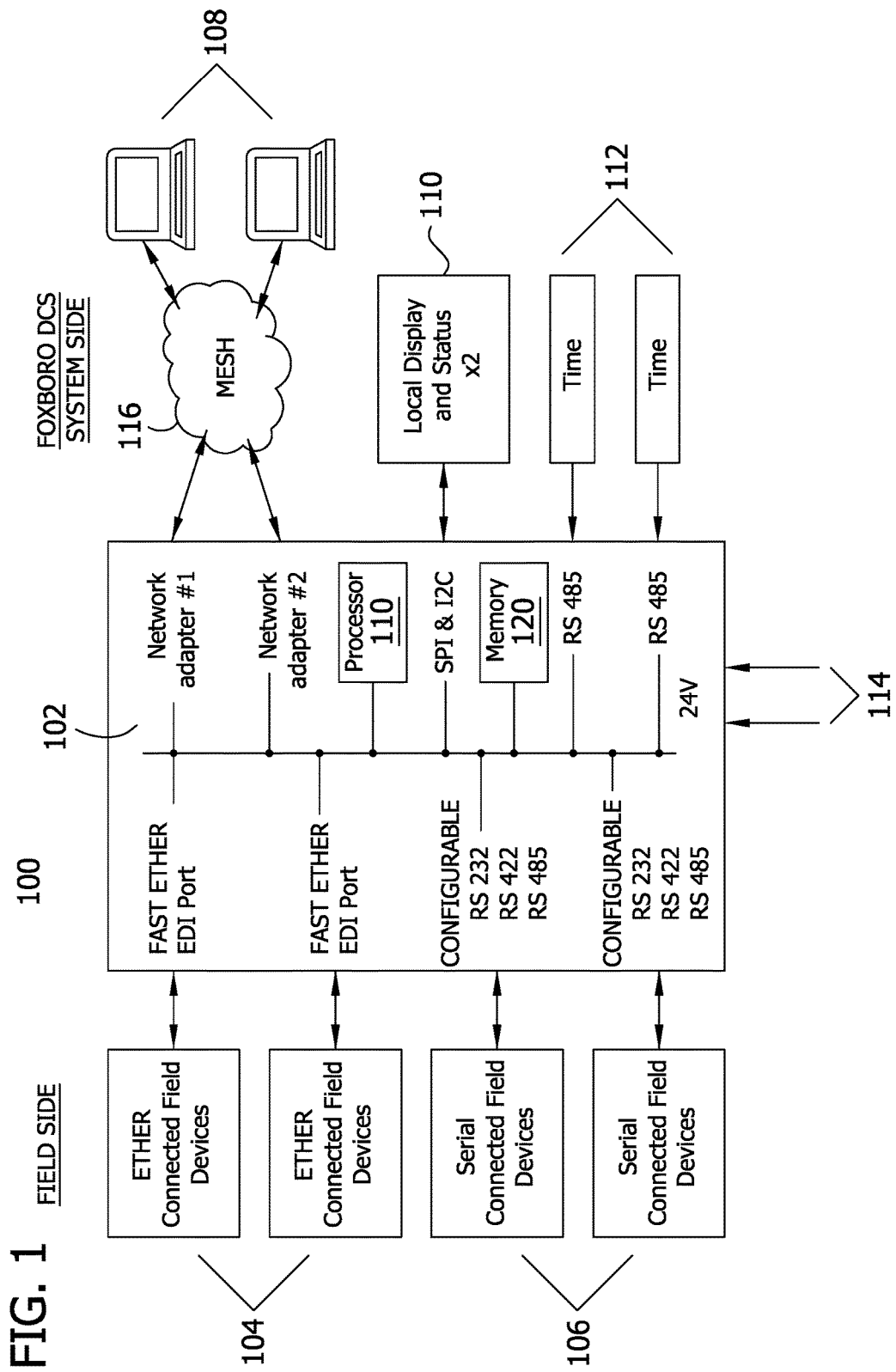
FIG. 1 is a block diagram of an exemplary process control system employing an embedded external device integrator (eEDI) device according to an embodiment of the disclosure.

Referring to FIG. 1, a process control system 100 embodying aspects of the disclosure comprises an embedded external device integrator (eEDI) device 102, Ethernet field devices 104, Serial field devices 106, workstations and controllers 108, interface devices 110, clock signals 112, and a power source 114. The eEDI device 102 includes a device integrator processor 118, a memory storage device 120, and a plurality of input/output data interfaces configured to support electronic data communications among field devices as described herein. The eEDI device 102 is communicatively and/or electrically coupled to the Ethernet field devices 104, the Serial field devices 106, the workstations and controllers 108, the interface devices 110, the clock signals 112, and the power source 114. Aspects of process control system 100, including eEDI device 102, are further described herein and in U.S. patent application Ser. No. 14/872,590, filed Oct. 1, 2015, entitled MULTI-CORE DEVICE WITH SEPARATE REDUNDANCY SCHEMES IN A PROCESS CONTROL SYSTEM, the entire disclosure of which is expressly incorporated herein by reference, including the contents and teachings of any references contained therein.

FIG. 1 shows the eEDI device 102 configured for communication with other devices in the process control system 100. The communications between the eEDI device 102 and other devices of process control system 100 comprise requests and commands from the eEDI device 102 to the other devices and responses and other data from the other devices to the eEDI device 102. The eEDI device 102 is connected to a power source 114 and a clock signal 112, which enables the eEDI 102 and modules therein to operate in synch. In an embodiment, the eEDI device 102 connects to one or more interface devices 110, which are used to communicate information, such as status information, from the eEDI device 102 to human operators, for example. The interface devices 110 communicate information from eEDI device 102 to operators via one or more input/output devices, such as a visual display or other interface. In an embodiment, the eEDI device 102 is referred to as a station and is comprised of one or more modules (e.g., primary module, shadow module, etc.) as further described herein.

The devices of process control system 100 connected to the eEDI device 102 are configured to communicate through various types of interfaces. The workstations and controllers 108 are connected to the eEDI device 102 through MESH network connections 116, the Ethernet field devices 104 are connected to the eEDI device 102 through Ethernet connections, and the Serial field devices 106 are connected to the eEDI device 102 through Serial connections in the embodiment of FIG. 1. In an embodiment, the eEDI device 102 communicates with Serial field devices 106 using a MODBUS protocol. In an embodiment, the eEDI device 102 may connect to other types of devices and/or communicate with connected devices using other types of communication protocols as understood by a person of ordinary skill in the art.

Figure 2:
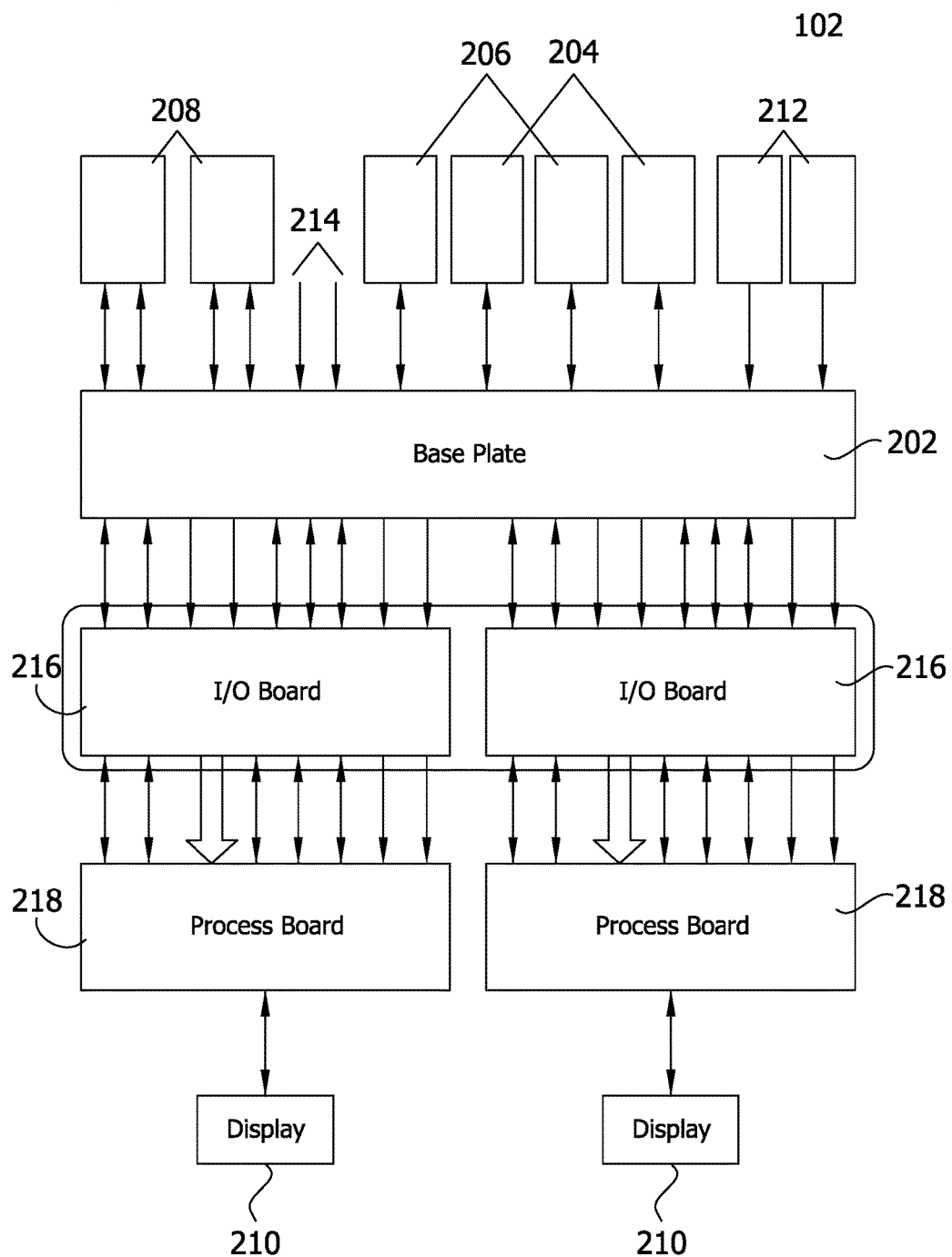
FIG. 2 is a diagram of exemplary hardware layers of the eEDI of FIG. 1.

Referring to FIG. 2, an embodiment the eEDI device 102 comprises a plurality of hardware layers. The eEDI device 102, in an embodiment, comprises one or more processor modules on a base plate 202, which connects the eEDI device 102 to external connections. An exemplary module includes, but is not limited to, a Field Device Controller 280 (FDC280) available from Schneider Electric, as further described herein. One or more I/O boards 216 of the processor modules are directly attached (e.g., electrically coupled and/or physically coupled) to the base plate 202. The I/O boards 216 act as a conduit between the base plate 202 and processor boards 218. The processor boards 218 execute all of the processing tasks for the eEDI device 102. In an embodiment, processor boards 218 correspond to processor 118. Displays 210 are connected (e.g., electrically and/or communicatively connected) to the processor boards 218 in order to monitor the activity of the eEDI device 102. Through the base plate 202, the eEDI device 102 interacts with (e.g., transmits data to and/or receives data from) MESH networks 116 via MESH network interfaces 208, serial field devices 106 via serial interfaces 206, and Ethernet field devices 104 via Ethernet interfaces 204. The eEDI device 102 is powered by the power source 114 connected via a power source interface 214 of the base plate 202, and processing tasks performed by the eEDI device 102 are synchronized based on clock signals 112 received via clock signal interfaces 212. An embodiment of the I/O boards 216 provide low voltage power to the processor boards 218 by transforming higher voltage power from the base plate 202 to the desired voltage.

Figure 3:
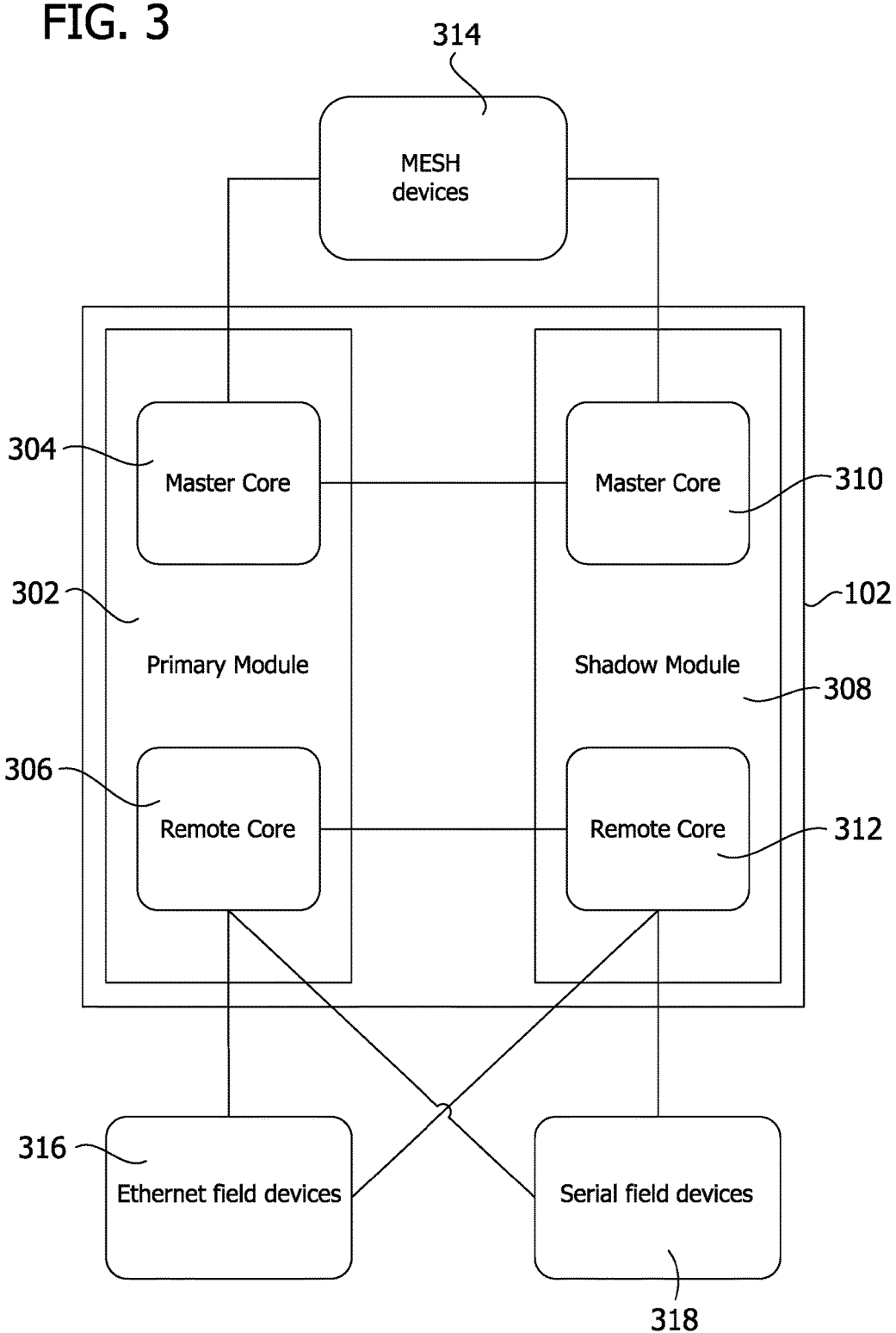
FIG. 3 is a diagram of the eEDI of FIG. 1 further illustrating redundant processing modules and multiple cores.

In an embodiment, the eEDI device 102 comprises a processor (e.g., processor 118) with multiple cores capable of executing processes in parallel. Referring to FIG. 3, the separate cores of the processor are each assigned processing tasks. A primary processor module 302 includes a master core 304 assigned to communicate with a first set of devices 314 and execute processing tasks associated with the first set of devices 314. A remote core 306 of the primary processor module 302 is assigned to communicate with a second set of devices 316 and 318 and execute processing tasks associated with the second set of devices 316 and/or 318. Additional cores may also be used in accordance with the described system. Alternatively, the eEDI device 102 comprises multiple processors configured to execute processes in parallel and a master processor and remote processor are used. It is to be understood that in an alternative embodiment, the master and remote cores could be designated first and second cores. It is to be further understood that in an alternative embodiment, the master and remote cores could be reversed.

The process control network schematically depicted in FIG. 3 is greatly simplified for purposes of illustration. Those skilled in the art will readily appreciate that both the number of components, at each depicted level of the exemplary process control system, is generally many times greater than the number of depicted components. This is especially the case with regard to the number of depicted field devices. In an actual process control environment, the number of field devices, comprising both input devices (e.g., transmitters and sensors) and output devices (e.g., positioners and actuators) number in the hundreds for an industrial process control system.

In an embodiment, the master core 304 is assigned to communicate with MESH network devices 314 and the remote core 306 is assigned to communicate with other devices, such as Ethernet devices 316 and Serial devices 318. In accordance with an aspect of the disclosure, MESH network devices 314 correspond to workstations and controllers 108, Ethernet devices 316 correspond to Ethernet field devices 104, and Serial devices 318 correspond to Serial field devices 106. Additionally, the master core 304 executes process control software in the form of control blocks. The control blocks are executed throughout the operation of the process. The remote core 306 gathers data from field devices connected to the remote core 306 as necessary. The data is used within the control blocks to determine commands to be provided to the connected field devices in order to maintain the process. In an embodiment, master core 304 executes the control blocks with field device data provided by remote core 306 and/or peer controllers. In an embodiment, the remote core 306 may also execute control blocks.

The master core 304 process includes digital communication (DCI) blocks configured to map device I/O data from devices that are connected to the remote core 306. The DCI blocks are populated with data from shared device I/O tables during an "inscan" step of the control process, which occurs immediately before the control blocks execute as further described herein. Referred to herein as blocks, it is to be understood that Input/Output blocks and the like may be embodied by embedded software objects that interface physical resources to the control subsystem.

In an embodiment, the remote core 306 is connected to one or more different types of field devices and each field device type requires a different driver, which is software that enables the remote core to communicate with the field device. The remote core maintains multiple drivers as necessary to communicate with each type of connected field device. Each device driver installed is represented in the remote core program by a driver block. The driver block contains a driver name, driver version identifier, and other driver specific configuration parameters that are deployed when the driver is initialized.

The remote core 306 further comprises blocks to control status information on specific buses connected to devices. There are, for example, two types of primary blocks containing Ethernet and serial connection information. The primary blocks also contain information such as assigned IP addresses. These addresses are assigned in such a way as to avoid address conflicts and conform to external network configuration. The serial primary block has additional information such as protocol and baud rate for each serial channel.

The remote core 306 program includes a device block used to report status and configuration information for each device configured to be attached to the remote core. In an embodiment, the remote core 306 supports up to 256 different device blocks.

In an embodiment, aspects of the disclosure implement different methods of time stamping data depending on how time stamps are applied by a driver of a remote device (e.g., a separate computing device remote from eEDI device 102). In the case where the driver does not append any time information, the internally generated time (e.g., based on clock signals 112) will be used with the data that is first installed into the DCI block on the master core side.

In the case where the driver implements its own time stamp scheme, the time stamp is applied when the data is received by the driver from the remote device (e.g., a separate computing device remote from eEDI device 102). The remote core maintains a time that is adjusted by the master core time services.

A third time stamping scheme comprises passing a remote time stamp from a remote device (e.g., a separate computing device remote from eEDI device 102) through the driver without modification. For example, the remote device may have its own time source and pass time stamps to the eEDI device 102.

The master core 304 and remote core 306 are further configured to indicate errors to the system (e.g., one or more controllers 108, etc.) when it is detected that they are malfunctioning, or if they are incapable of performing. For instance, when the master core 304 and/or remote core 306 are scheduled to scan devices faster than possible, the master core 304 and/or remote core 306 indicates a scan overrun error to one or more controllers 108 (e.g., the Systems Management Operator Interface, etc.). If more devices are installed on the master core 304 and/or remote core 306 than the core can handle, the core indicates a lack of memory error to one or more controllers 108 (e.g., the Systems Management Operator Interface, etc.). If the master core 304 and/or remote core 306 runs out of CPU resources, the core indicates an insufficient resources error to one or more controllers 108 (e.g., the Systems Management Operator Interface, etc.).

In an embodiment, the eEDI device 102 further comprises a second redundant processor module, or shadow processor module 308, with the same number of cores as the first processor module, or primary processor module 302. Both the primary module 302 and the shadow module 308 receive the clock signal, which may be referred to as a Time strobe in an embodiment. In an embodiment, this clock signal is used as a precision time maintenance strobe along with a message indicating time of day. In accordance with an aspect of the disclosure, there is a toggling signal between the primary module 302 and the shadow module 308, which indicates, for example, presence. Both modules 302, 308 are powered by a power source (e.g., power source 114, etc.). The shadow module 308 is configured to split communication and processing tasks between the cores thereof in the same way as the primary module 302 described above. Generally, the shadow module 308 takes over for the primary module 302 in the event that the primary module 302 can no longer function (e.g., experiences a fault and/or failure, etc.) or at the discretion of an operator. In this way, even if the primary module 302 is unavailable, the process control system will be able to continue operation based on the processes of the shadow module 308. In an embodiment, the primary module 302 and the shadow module 308 each comprise a Field Device Controller 280 (FDC280) available from Schneider Electric, as further described herein.

Each master and remote core on the primary and shadow modules 302, 308 are related via a redundancy scheme. A redundancy scheme defines the operations of each core with respect to its redundant partner core. It also defines the method with which the primary core and shadow core communicate and stay synchronized. In an embodiment, the redundancy scheme between the primary master core and the shadow master core is different than the redundancy scheme between the primary remote core and the shadow remote core. For example, the primary master core and the shadow master core implement a tightly coupled redundancy scheme while the primary remote core and the shadow remote core implement a hot-standby, single side scan, or other known redundancy scheme.

In an embodiment, the process of "marrying" a new shadow module 308 to a primary module 302 running alone is executed without interrupting processes of the primary module 308 significantly. In an embodiment, an insignificant interruption includes fully interrupting processes of the primary module 308 but only for a short (e.g., 1.0 seconds or less, etc.) period of time. In an embodiment, the marriage process takes less than or equal to one second. The primary module 302 detects that a new module is available to join up and act as shadow module 308. The software images on the primary module 302 and new shadow module 308 are compared and the new shadow module software image is updated by a flash duplication process to match that of the primary module if necessary. In an embodiment, both the primary module 302 and shadow module 308 perform the comparing and updating in a cooperative manner. The primary module 302 copies all data from the primary master core 304 thereof necessary for redundant operation to the shadow master core 310 of the shadow module 308 over a high speed electrical and/or communicative interlink between the modules 302, 308. The copied data includes all variable data that controls the execution of the primary module 302, such as allocated memory, task stacks which preserves all required CPU register states, communication buffers which preserves data traffic in transition, and the like.

The primary master core 304 and shadow master core 310 are fully synchronized over a high speed electrical and/or communicative interface. The synchronization of the master cores 304, 310 enables control failover with fully connected communications maintained. In an embodiment, communications (e.g., COMEX and TCP/IP stack messages, etc.) with MESH network devices 314 are fully maintained through a failover situation. Failover transitions are accomplished with no control parameter changes or control state changes, with the only control artifact being a pause of less than one second in control data flow to and from external devices.

The redundancy system of the master cores 304, 310 includes data from remote devices (e.g., field devices connected to the remote cores). The primary remote core 306 scans the data and writes the scanned data to the shared device I/O table, as further described herein. The primary master core 304 reads the data on the device I/O table and then copies the data to the shadow master core 310 immediately. Both the primary master core 304 and the shadow master core 310 then use the data to execute the control process, maintaining synchronization of I/O values.

Both the primary master core 304 and the shadow master core 310 perform all writes from the control blocks of the primary and shadow master cores 304, 310 to the device I/O tables. The primary master core 304 and shadow master core 310 compare the written data, allowing both cores 304, 310 to maintain synchronized copies of all output data in each device table in the event of failover.

In an embodiment, the redundancy system of the remote cores 306, 312 is different than that of the master cores 304, 310, which operate in lock-step. For example, remote cores 306, 312 are capable of performing different actions and running different types of operations than the master cores 304, 310. While different, these operations are coordinated by the master cores, thus making device input data (e.g., data stored in the I/O table, etc.) immediately available to the master cores 304, 310. The primary remote core 306 scans (e.g., sends read messages to) all I/O data from the connected remote devices 316 and 318. The shadow remote core 312 forms connections to the remote devices 316 and 318 but does not scan the remote devices. For example, the shadow remote core 312 may send heartbeat messages to confirm that it is able to connect to the remote devices. This connection without scanning enables the shadow remote core 312 to take over from the primary remote core 306 quickly if necessary, and the I/O devices (e.g., remote devices 316, 318) are not burdened with double the number of scan messages.

A failover condition for the primary remote core 306 is signaled when it is detected that the shadow remote core 312 has connections to more devices than the primary remote core 306. In an embodiment, the primary remote core 306 and shadow remote core 312 perform a comparison of the number of connections thereof. In this case in which the shadow remote core 312 has connections to more devices than the primary remote core 306, the shadow remote core 312 takes over the duties of the primary remote core 306 and the shadow master core 310 takes over the duties of the primary master core 304.

In an alternative embodiment, the primary remote core 306 and the shadow remote core 312 work in concert. For example, the primary remote core 306 scans each remote device 316, 318 connected to the primary remote core 306. But if a remote device 316, 318 is only connected to the shadow remote core 312, then the shadow remote core 312 executes scanning of that device.

In an embodiment, each remote core 306, 312 maintains an independent Ethernet connection to the remote devices 316, 318.

In an embodiment, synchronization of the primary and shadow modules 302, 308 is implemented by requiring that certain important tasks be executed by both modules before moving on to other tasks. The synchronization code is placed in the software of each module 302, 308, protecting important parts of the code such as changing values in a database or reading values from other memory devices of the eEDI device 102. When one of the modules hits a synchronization point during execution of the code, it waits for a span of time for the other module to also reach it. Typically, the synchronization occurs very quickly as the modules are tightly synchronized. However, if the two modules fail to meet at a synchronization point within a predetermined synchronization time limit, the modules attempt to resolve a hardware issue or perform a "hot re-marry" process according to the marriage process described above. In an embodiment, the synchronization time limit is 8 milliseconds.

Referring to primary module 302 for purposes of illustration, the master core 304 and the remote core 306 are electrically and/or communicatively connected and communicate with each other during operation. The remote core protocols interact with the master core 304 during the input scanning, or "inscan", and output writing, or "outscan", and maintenance periods of the control cycle. "Inscan" is a stage prior to the execution of the control blocks wherein data values from the field devices are gathered into the master core blocks for use during control block execution. "Outscan" is a stage after the execution of the control blocks where data values calculated by the control block execution are sent to the field devices to maintain the operation of the process. In this way, the process control system forms a feedback loop, enabling the control system to react to events and act to correct issues within the process. In an embodiment, the interaction between master core 304 and remote core 306 uses three data stores in shared memory. The data stores are the device I/O data, the device configuration data, and the driver status data. The master core 304 and the remote core 306 also communicate using a messaging service apart from the shared memory data stores. In an embodiment, the primary master core 304 and the shadow master core 310 also share data as part of the I/O scanning, or inscan, process as part of the master core's cyclic process.

Figure 4:
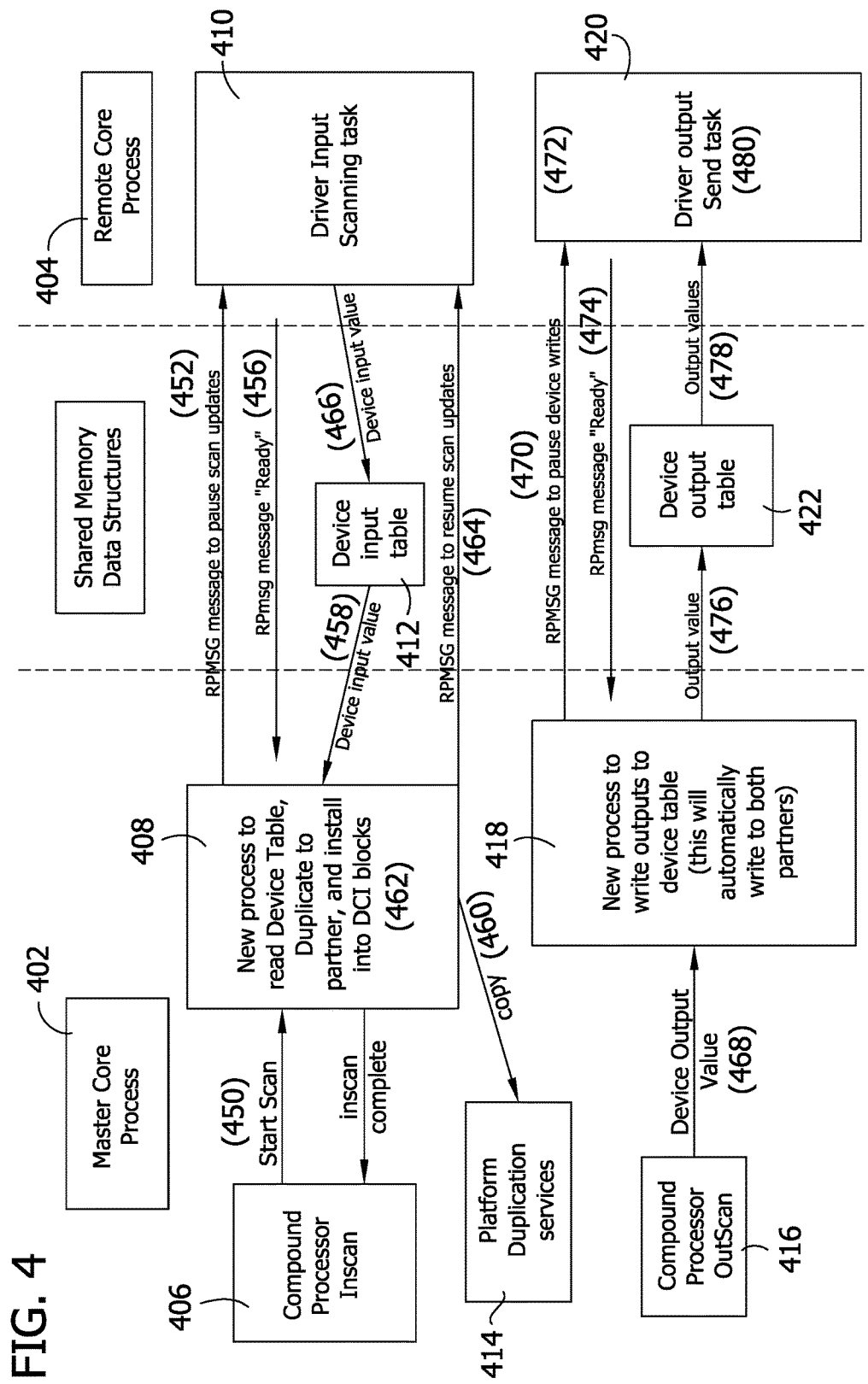
FIG. 4 is a diagram showing an exemplary interaction between a master core and a remote core during inscan and outscan processes.

FIG. 4 shows the data interaction between a master core process 402 and a remote core process 404 for data inscan and outscan according to an embodiment of the disclosure. As shown, the master core process 402 and the remote core process 404 interact to link device data and status to the control blocks and driver functionality in the master core process 402. At the beginning (450) of a compound processor inscan 406, a master core interaction process 408 messages (452) the remote core process 404, instructing it to pause scan updates of a device input table 412. The remote core process 404 pauses (454) scan updates from a driver input scanning task 410 and replies (456) to the master core interaction process 408 that the device input table 412 is ready for scanning. The master core interaction process 408 reads (458) the device input table 412 data, duplicates (460) the data to its partner processes (e.g., the equivalent functions executing in the shadow module 308) 414, and installs (462) the device data into control blocks. The master core process 402 then messages (464) the remote core process 404 to resume the scan updates. The remote core process 404 resumes (466) updating the device table. In an embodiment, the master core process 402 uses the newly read data to execute control blocks.

When the master core process 402 executes an outscan 416, the processor passes (468) device output values to a master core interaction process 418, which interacts with the remote core 404. The master core interaction process 418 sends (470) a message to the remote core process 404 to pause writing to devices by a driver output send task 420. The remote core process 404 pauses (472) device writing tasks and responds (474) to the master core process 402 that it is ready for the outscan. The master core interaction process 418 writes (476) the output values to a shared device output table 422. The remote core process 404 reads (478) the output values from the device output table 422 to the driver output send task 420 and then resumes (480) device writing.

In an embodiment, master core process 402 and remote core process 404 each comprise processor-executable instructions embodied on a storage memory device (e.g., memory storage device 120) to provide data inscan and outscan via a software environment when executed by a processor (e.g., processor 118). For example, master core process 402 and remote core process 404 may be provided as processor-executable instructions that comprise a procedure, a function, a routine, a method, and/or a subprogram utilized independently or in conjunction with additional aspects of a computing device (e.g., eEDI device 102) on which they are implemented according to an exemplary embodiment of the disclosure.

Figure 5:
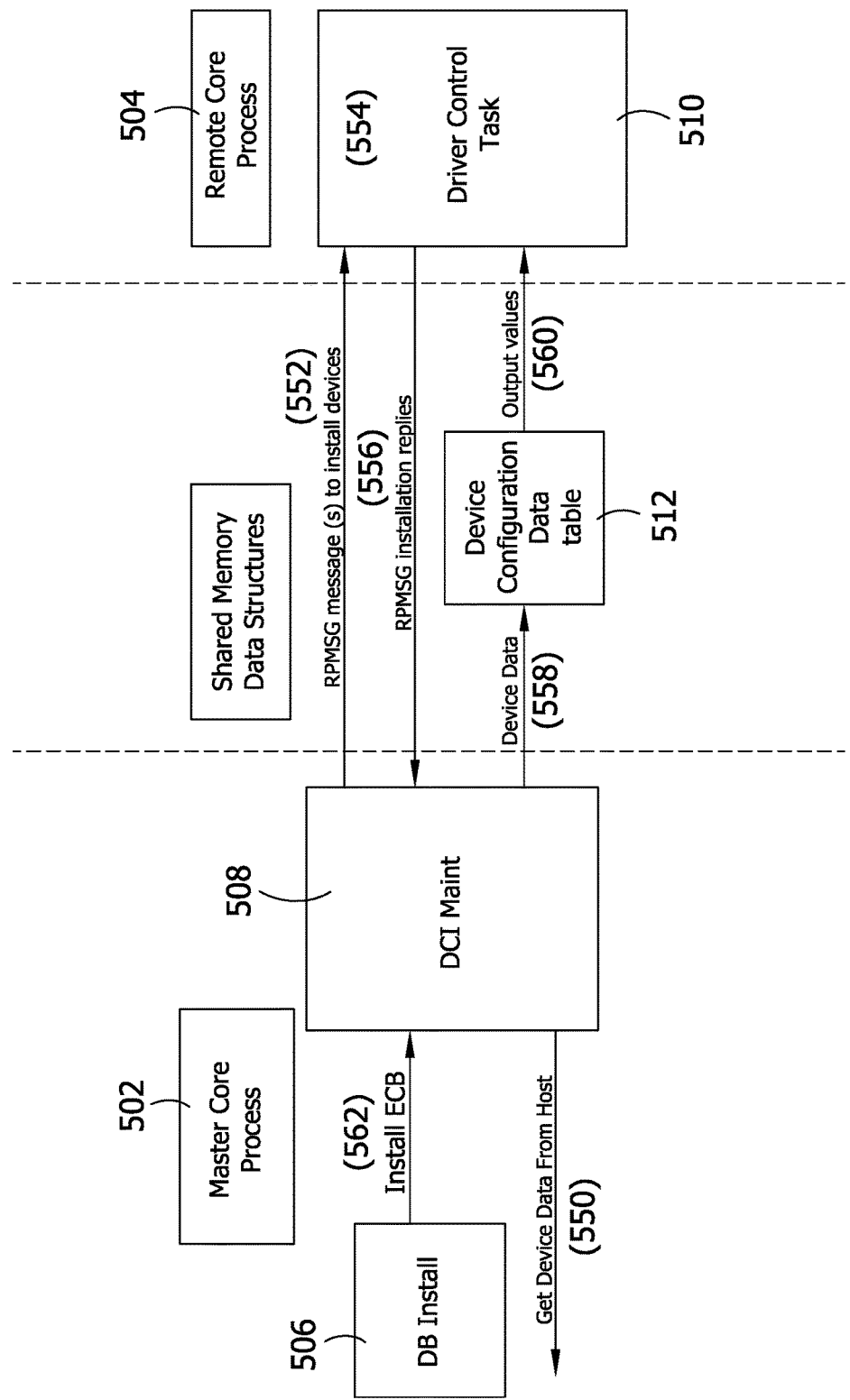
FIG. 5 is a diagram showing an exemplary interaction between a master core and a remote core during a device installation.

In an embodiment, the master core interacts with the remote core to perform maintenance tasks such as installing devices. In FIG. 5, an exemplary process of installing a device is described. A master core process 502 executes a maintenance process 508, which obtains (550) device data from a device host 506. The maintenance process 508 sends (552) a message to a remote core process 504, instructing it to install (554) the device by a driver control task 510. The driver control task 510 responds (556) to the maintenance process 508, confirming the installation instruction. The maintenance process 508 writes (558) the device data to a shared device configuration data table 512. The driver control task 510 reads (560) the device data from the device configuration data table 512 and completes the device installation (562).

The device configuration table 512 in the illustrated embodiment contains configuration information for each installed device. When a new device and associated block are added to the system, the block contains file information for the device and the file information is loaded to the system in a DCI block.

In an embodiment, master core process 502 and remote core process 504 each comprise processor-executable instructions embodied on a storage memory device (e.g., memory storage device 120) to perform maintenance tasks via a software environment when executed by a processor (e.g., processor 118). For example, master core process 502 and remote core process 504 may be provided as processor-executable instructions that comprise a procedure, a function, a routine, a method, and/or a subprogram utilized independently or in conjunction with additional aspects of a computing device (e.g., eEDI device 102) on which they are implemented according to an exemplary embodiment of the disclosure.

Figure 6:
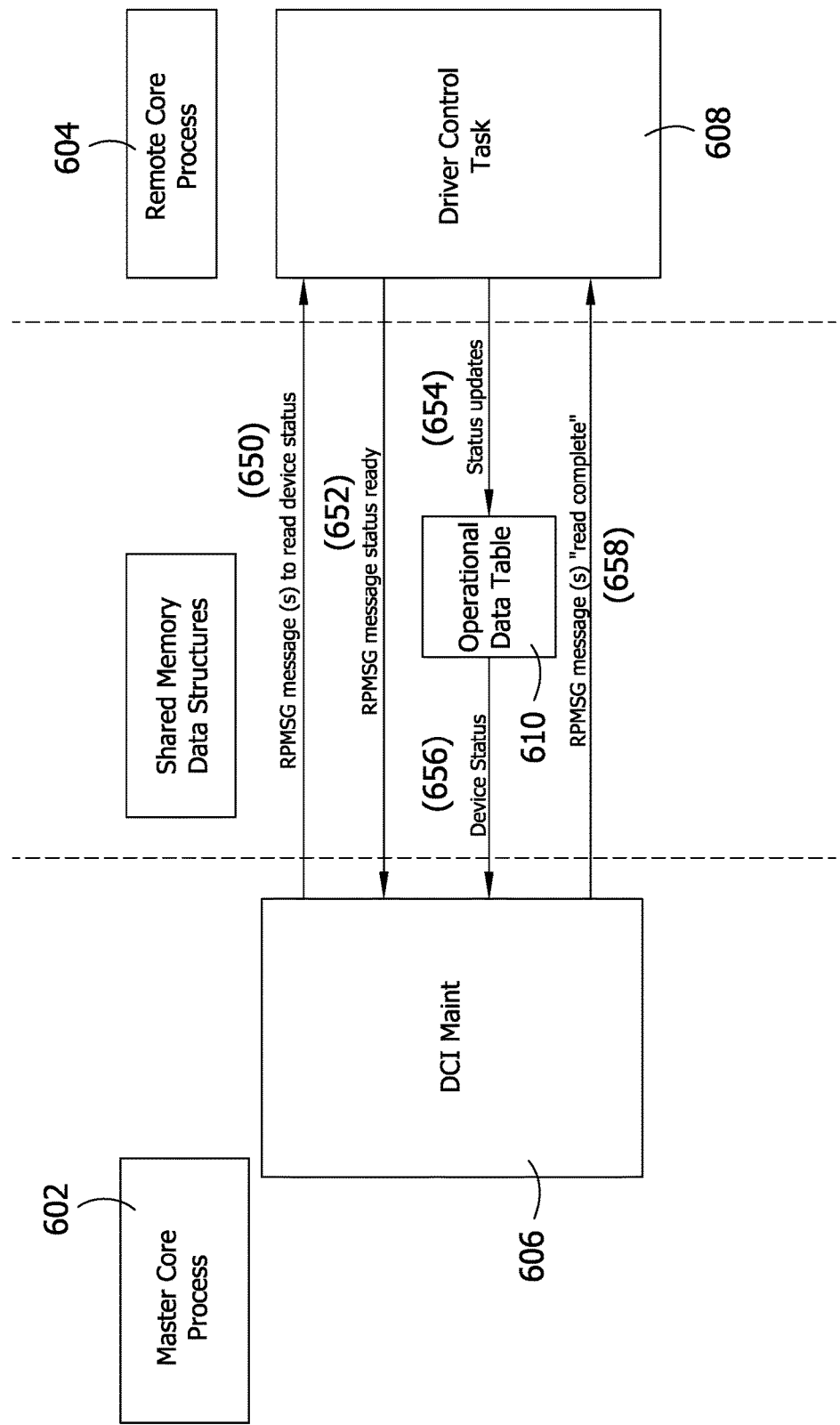
FIG. 6 is a diagram showing an exemplary interaction between a master core and a remote core during a device status request.

Referring now to FIG. 6, a master core process 602 monitors the status of devices connected to a remote core process 604. In the illustrated embodiment, the master core process 602 executes a maintenance process 606 that interacts with the remote core process 604 via a driver control task 608. The maintenance process 606 sends (650) a message to the remote core process 604 instructing it to read a device status. The remote core process 604 reads the status and responds (652) that the status is ready. The remote core process 604 also writes (654) the device status data to a shared operational data table 610. The maintenance process 606 then reads (656) the device status from the operational data table 610. Upon successfully reading the device status data from the operational data table 610, the maintenance process 606 sends (658) a message to the remote core 604 that the status read is complete.

The shared operational (e.g., device I/O) data table 610 is a shared memory space between the master core process 602 and the remote core process 604. It contains points of I/O data to and from remote devices. Device input data is updated by the primary remote core scanning applications for input data and is read by the master core process 602 just before the control blocks execute for a cycle.

After the device I/O data is read from the table 610, it is exchanged from the primary module (e.g., primary module 302) to the shadow module (e.g., shadow module 308) and then the data is copied into the DCI control blocks. After the control blocks are executed, newly calculated values are written to the shared operational table 610 and then read by the remote core process 604 to distribute the values to the connected devices.

In an embodiment, master core process 602 and remote core process 604 each comprise processor-executable instructions embodied on a storage memory device (e.g., memory storage device 120) to provide device status monitoring via a software environment when executed by a processor (e.g., processor 118). For example, master core process 602 and remote core process 604 may be provided as processor-executable instructions that comprise a procedure, a function, a routine, a method, and/or a subprogram utilized independently or in conjunction with additional aspects of a computing device (e.g., eEDI device 102) on which they are implemented according to an exemplary embodiment of the disclosure.

FIGS. 7-12 show exemplary architectures of the Embedded External Device Integrator (eEDI) (e.g., eEDI device 102) connected to a variety of field devices.

Figure 7:
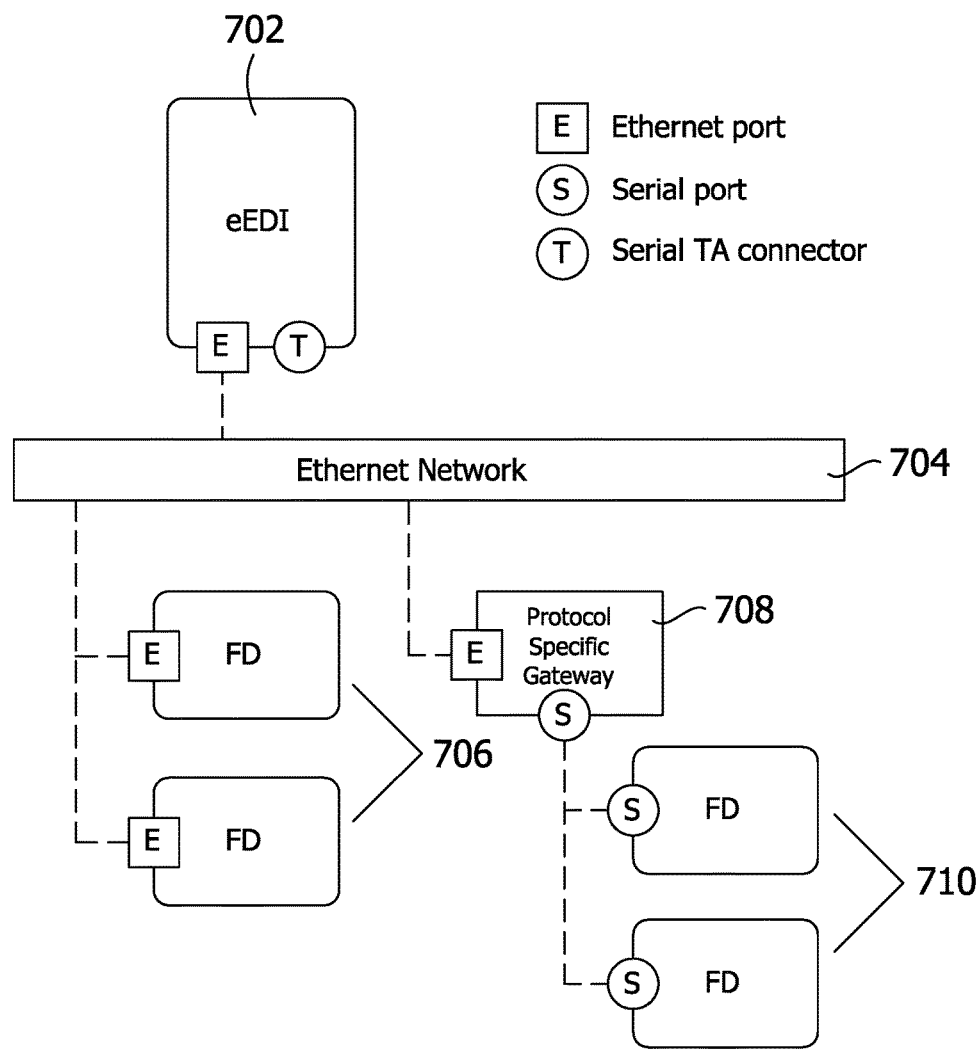
FIG. 7 is a diagram of an exemplary layout of single eEDI system connected to field devices by Ethernet.

FIG. 7 shows a single eEDI device 702 connected to several field devices via an Ethernet network 704. The eEDI device 702 includes an Ethernet port connected to the Ethernet network 704. Field devices 706 are connected via Ethernet ports directly to the Ethernet network 704. A gateway device 708 is also connected to the Ethernet network 704 and is configured to translate data on the Ethernet network 704 from an Ethernet protocol to a serial protocol. In this manner, gateway device 708 comprises a protocol-specific gateway in an embodiment. Field devices 710 are each connected via a serial port to the gateway device 708. The gateway device 708 enables the communication between the eEDI 702 Ethernet connection and the field devices 710 connected by serial ports.

Figure 8:
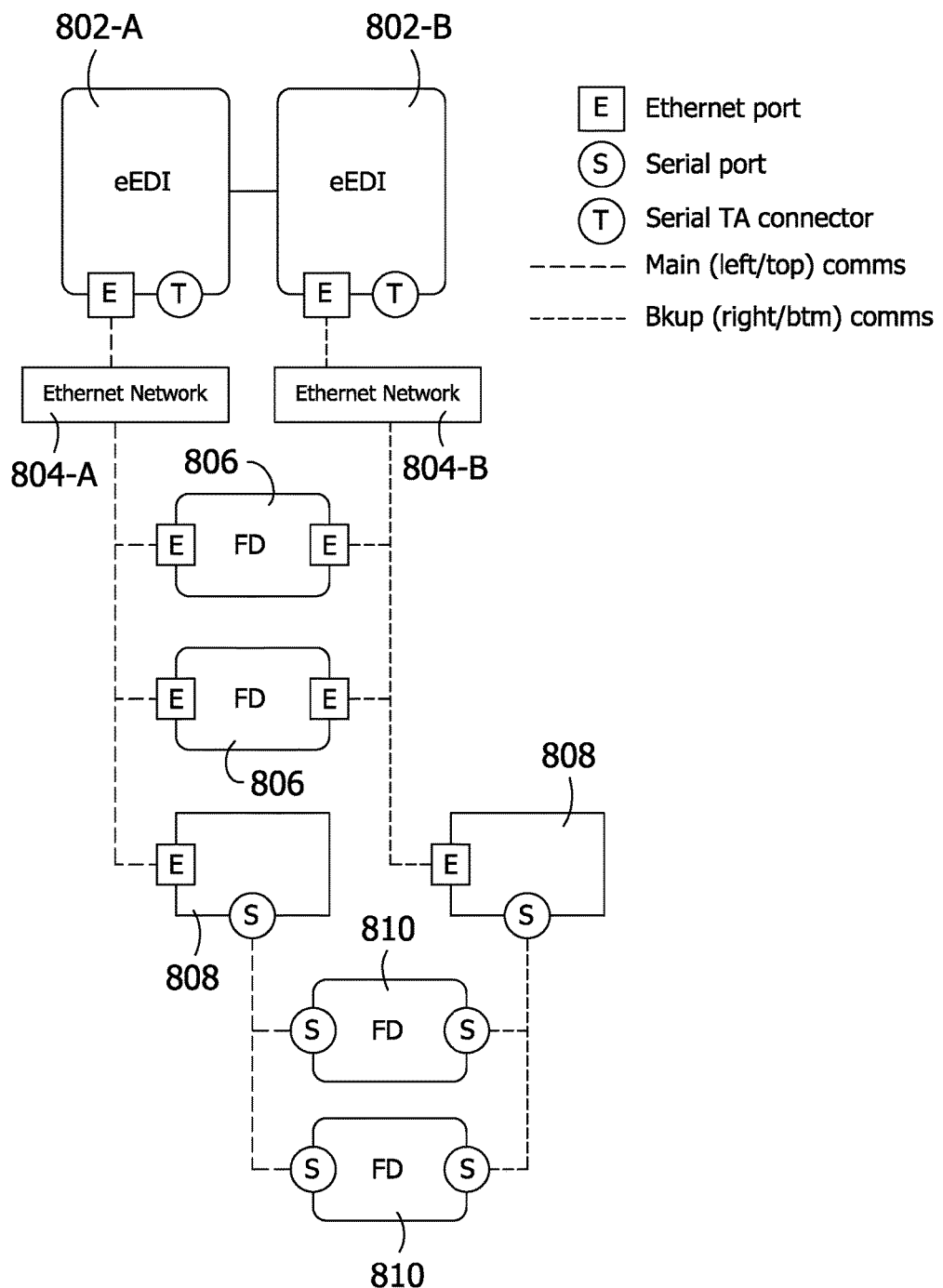
FIG. 8 is a diagram of an exemplary layout of a system with two eEDI systems and two Ethernet networks.

FIG. 8 shows redundant eEDI devices 802-A, 802-B connected to two separate Ethernet networks 804-A, 804-B, respectively. Separate physical networks have the advantage of preventing network issues with one network from affecting the other network. Additionally, if a device has identical IP addresses or MAC addresses on two of its ports, the device cannot connect with both ports on the same network.

The eEDI devices 802-A, 802-B are communicatively connected to each other and each is connected to a separate Ethernet network 804-A, 804-B, respectively. Field devices 806 each have two Ethernet ports with identical IP addresses and are connected to both of the Ethernet networks 804-A, 804-B. As in the previous figure, there are gateway devices 808 connected to Ethernet networks 804-A, 804-B. Each gateway device 808 is connected to one of the Ethernet networks 804-A, 804-B via an Ethernet port and they share identical IP addresses. The gateway devices 808 are configured to translate data on the Ethernet networks 804-A, 804-B from the Ethernet protocol into a serial protocol for field devices 810. Field devices 810 are connected to both gateway devices 808 via two serial ports and are configured to communicate through the gateway devices 808 to the eEDI devices 802-A, 802-B. This architecture cannot maintain redundancy for connected single-ported field devices.

Figure 9:
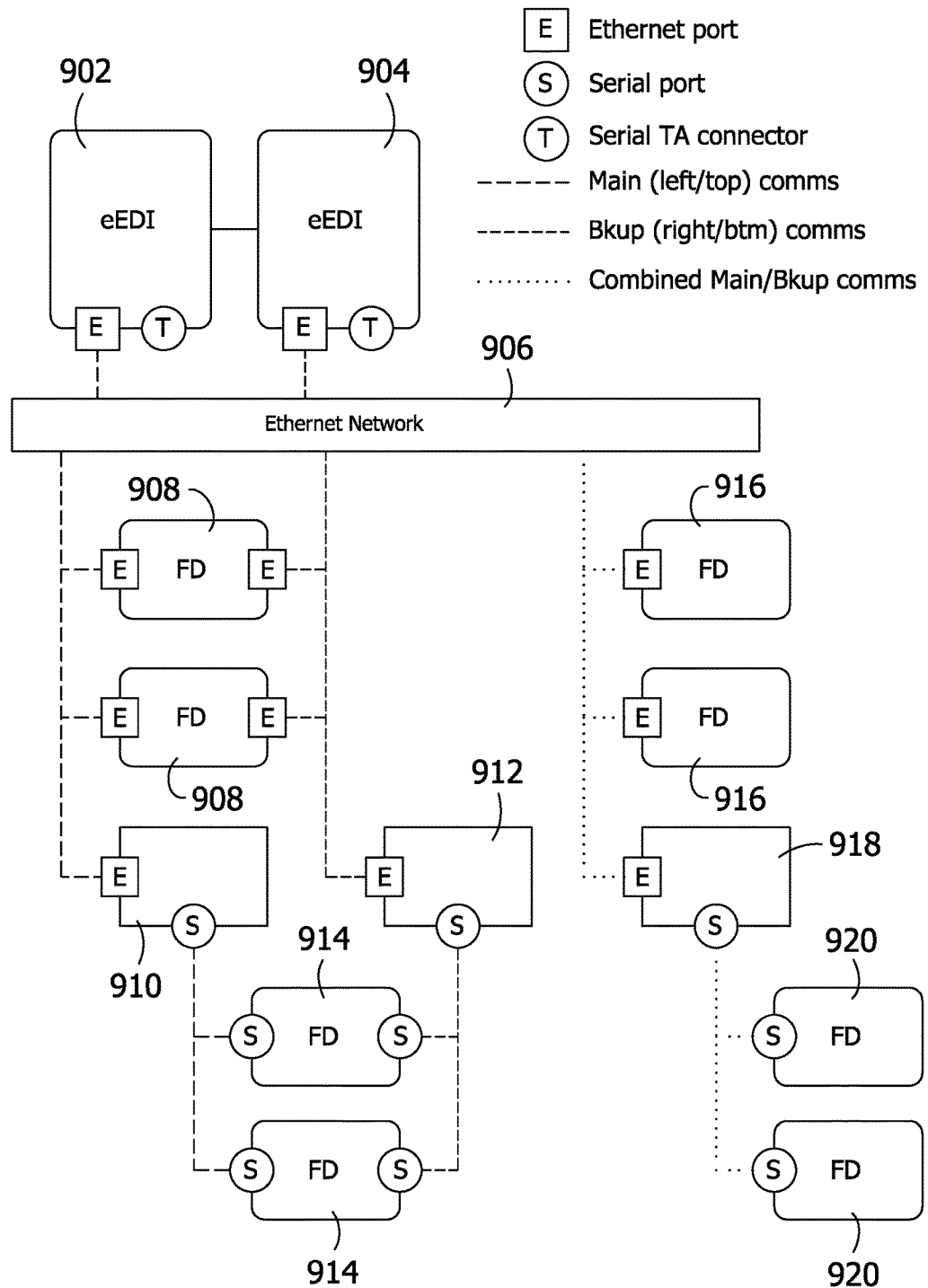
FIG. 9 is a diagram of an exemplary layout of a system with two eEDI's systems and a shared Ethernet network.

FIG. 9 shows redundant eEDI devices 902 and 904 connected to a single Ethernet network 906. In this embodiment, each eEDI 902, 904 has a unique IP address to permit its connection to the single Ethernet network 906. Similar to FIG. 8, there are field devices 908 connected to the Ethernet network 906 via Ethernet ports. Field devices 908 each have two Ethernet ports with different IP addresses. One of the Ethernet ports is connected to the main eEDI 902 and the other port is connected to the shadow eEDI 904. There are also gateway devices 910 and 912 connected to the Ethernet network 904 with separate IP addresses. Gateway device 910 is connected to main eEDI 902 and gateway device 912 is connected to eEDI 904. The gateway devices 910 and 912 are configured to translate data on the Ethernet network 906 from the Ethernet protocol into a serial protocol for field devices 914. Each field device 914 has two serial ports, one of which is connected to gateway device 910 and the other of which is connected to gateway device 912.

In addition to field devices 908 and 914, field devices 916 each include an Ethernet port configured to connect the field device to the Ethernet network 906. Field devices 916 each have a single Ethernet port with a unique IP address. Field devices 916 are configured to maintain combined connections via the Ethernet ports to both eEDI 902 and eEDI 904 for redundancy purposes. Gateway device 918 is configured to connect to eEDI 902 and eEDI 904 via a single combined Ethernet connection. Gateway device 918 is configured to translate data on the Ethernet network 906 from the Ethernet protocol into a serial protocol for field devices 920. Field devices 920 are each configured to communicate with both eEDI 902 and eEDI 904 through a single serial port via the gateway device 918.

In an embodiment, a single-ported field device connected to an eEDI system can handle multiple simultaneous connections, so the primary module (e.g., primary module 302) and the shadow module (e.g., shadow module 308) each establish separate connections with the field device. The primary module in this embodiment performs the scanning tasks and writing tasks, while the shadow module maintains contact through minimal periodic communications, such as a configurable heartbeat or the like, to verify connectivity. In an embodiment, shadow module's periodic communications to the field device is at a rate substantially equal to the rate that the primary module is scanning the field device.

Alternatively, if the single-ported field device cannot handle multiple simultaneous connections, then the shadow module (e.g., shadow module 308) will only perform simple pings to verify connectivity without maintaining a connection.

In an embodiment, a dual-ported field device connected to a common network maintains a connection with the primary module (e.g., primary module 302) with one port and the shadow module (e.g., shadow module 308) with the other port, as shown in FIG. 9. This enables the shadow module to take over in the event of port failure at the field device. However, if there are multiple field devices connected in this configuration and some of the field devices have failed primary ports while others have failed shadow ports, the system is configured to determine which module to run as primary and thereby, which field devices to maintain.

Alternatively, the common network (e.g., Ethernet network 906) allows for device port switching, in which the primary module (e.g., primary module 302) switches the port it is connected to when it detects a port failure on the other port.

In an embodiment, a field device comprises internal redundancy. If the primary module of the field device fails, then the shadow module of the field device takes over the primary module's IP address and assumes control. In this embodiment, the field device is effectively a single-ported field device.

Figure 10:
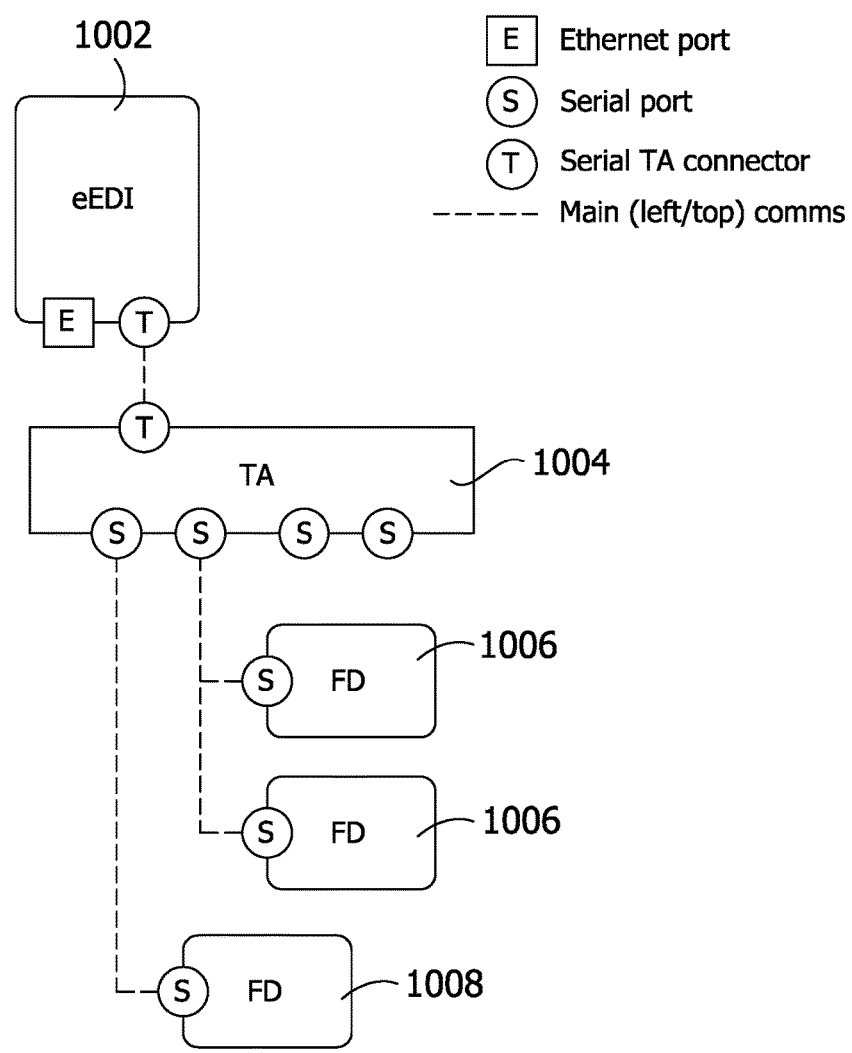
FIG. 10 is a diagram of an exemplary layout of a single eEDI system connected to field devices serially.

FIG. 10 shows a diagram of a single eEDI device 1002 connected to field devices 1006 and 1008 through a serial port termination assembly (TA) device 1004. The eEDI 1002 connects to the TA 1004 via a serial TA connector. The TA 1004 includes four serial ports, but alternative embodiments may include different numbers of serial ports. Field devices 1006 share a single serial port of TA 1004 and communicate using a protocol that enables shared port usage. Field device 1008 connects to a separate serial port of TA 1004.

Figure 11:
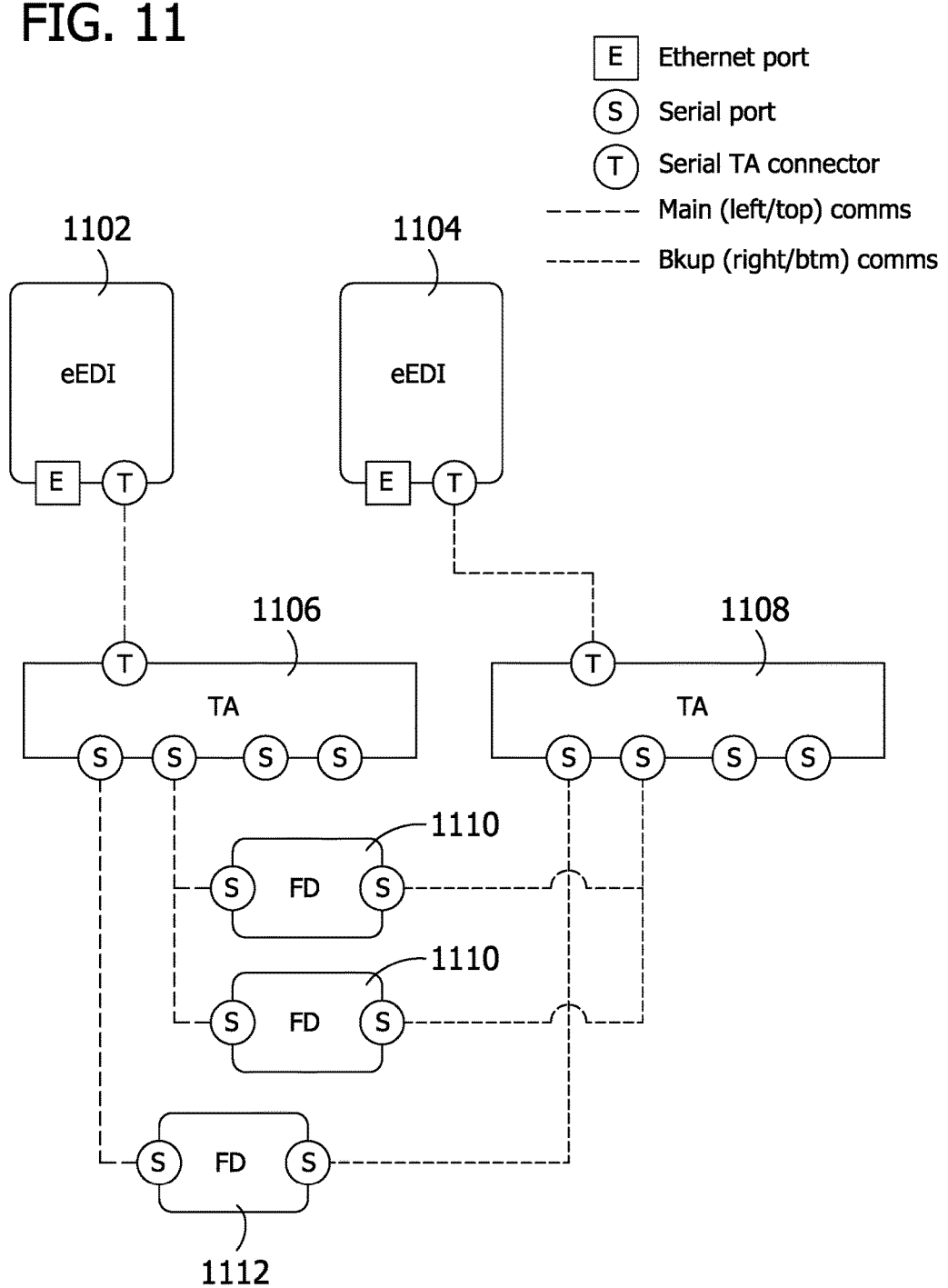
FIG. 11 is a diagram of an exemplary layout of a system with two eEDI's systems connected serially to dual-port field devices.

Referring now to FIG. 11, a diagram of redundant eEDI devices 1102 and 1104 connected to dual-port field devices 1110 and 1112 via serial ports through serial TA connectors 1106 and 1108 is shown. Primary eEDI 1102 connects to TA 1106 to communicate with field devices 1110 and 1112 via serial ports. Shadow or backup eEDI 1104 connects to TA 1108 to communicate with field devices 1110 and 1112 via secondary serial ports. Field devices 1110 share a single serial port connection on each TA 1106 and 1108 and use a protocol that enables the serial port to be shared. Field device 1112 connects to a separate serial port on each TA 1106 and 1108. Primary eEDI 1102 is responsible for scan and write tasks for the field devices, but in the event of a failure in the system, the shadow eEDI 1104 takes over the responsibility and becomes the primary eEDI.

Figure 12:
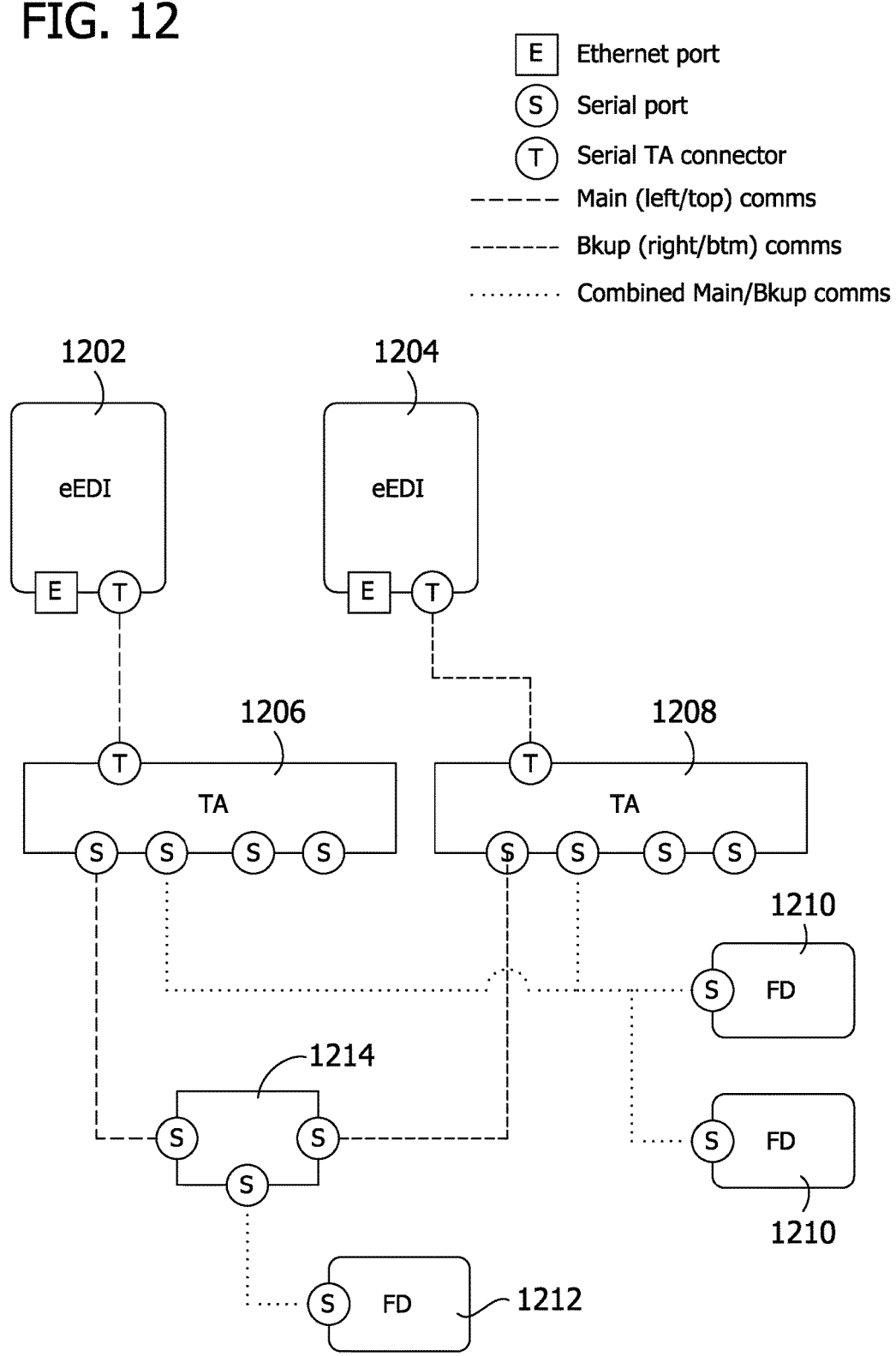
FIG. 12 is a diagram of an exemplary layout of a system with two eEDI's systems connected serially to single-port field devices.

FIG. 12 shows a diagram of redundant eEDI devices 1202 and 1204 connected to serial TA connectors 1206 and 1208, respectively. Field devices 1210 are single-ported field devices connected to serial ports on both TA devices 1206 and 1208. The serial connection is shared between primary eEDI 1202 and shadow eEDI 1204 using a protocol that prevents collisions. In an embodiment, the primary eEDI 1202 sends communications on the shared bus while both the primary eEDI 1202 and shadow eEDI 1204 listen for communications on the bus. The field device 1212 is connected to both TA devices 1206 and 1208 through a switch device 1214. The connections between TA devices 1206 and 1208 and the switch device 1214 use a different protocol which does not prevent collisions like the connection to field devices 1210. The switch device 1214 is necessary for the single-ported field device 1212 to be connected to both eEDI devices 1202 and 1204.

In accordance with an aspect of the disclosure, eEDI devices 1202 and 1204 (e.g., FT FDC280 modules) connected as illustrated in FIG. 12 work in concert so that only one of the eEDI devices 1202, 1204 is driving the serial connection (e.g., Serial Interface bus) at any given time. While the one of the eEDI devices 1202, 1204 is driving the serial connection, the other eEDI device 1202, 1204 disconnects itself from the serial connection. In an exemplary embodiment, eEDI devices 1202, 1204 are FDC280 modules and field device 1212 is a single-ported RS-232 device and the serial ports of eEDI devices 1202, 1204 are connected to field device 1212 via a Y-cable/connector (e.g., that has all pins going straight through to both ends). In another exemplary embodiment, eEDI devices 1202, 1204 are FDC280 modules and field device 1212 is a single-ported RS-485 device. In yet another exemplary embodiment, eEDI devices 1202, 1204 are FDC280 modules and field device 1212 is a single-ported RS-422 device.

In an embodiment, the primary eEDI 1202 handles communications and shadow eEDI 1204 periodically tests its connection. In this embodiment, communication with the single-ported field device 1212 is predominately through the primary eEDI 1202. During this time, the shadow eEDI 1204 disables its corresponding port to prevent interference with communications of the primary eEDI 1202. On a periodic basis (e.g., a slow periodic basis), the primary eEDI 1202 relinquishes control of the port so that the shadow eEDI 1204 can test its connection to the field device 1212. When the shadow eEDI 1204 obtains control of the port, it tests its connectivity by sending a single heartbeat test message to the field device 1212. In an embodiment in which there are a plurality of field devices 1212, the shadow eEDI 1204 tests its connectivity by sending the heartbeat test message to one of the field devices 1212 that the primary eEDI 1202 reports as having good connectivity. The shadow eEDI 1204 reports the results of the connectivity test to the primary eEDI 1202 and relinquishes control of the port. The primary eEDI 1202 then reacquires control of the port and resumes normal communications to the field device 1212, as described above. In accordance with an aspect of the redundancy algorithm implemented between primary eEDI 1202 and shadow eEDI 1204, the shadow eEDI 1204 considers device(s) 1212 on the port to be equal to the primary eEDI 1202 when the test performed by shadow eEDI 1204 is unsuccessful. If the test performed by shadow eEDI 1204 fails, then shadow device(s) on the port will be considered to have no connectivity.

In another embodiment, the eEDI devices 1202, 1204 confirm shadow device connectivity when primary device connectivity fails. In the event that primary eEDI 1202 loses all connectivity to a port (i.e., all devices configured for that port are unresponsive), then the primary eEDI 1202 immediately relinquishes control of the port and requests the shadow eEDI 1204 to test its device connectivity to determine whether the failure is one-sided. When the shadow eEDI 1204 obtains control of the port, it sends a heartbeat test message to each of the configured devices on that port. When the tests are complete, the shadow eEDI 1204 reports the results of the tests to the primary eEDI 1202 and relinquishes control of the port. If the test results indicate that shadow eEDI 1204 has good device connectivity, the executing redundancy algorithm takes into account the better connectivity of the shadow eEDI 1204 on this port. Redundancy role switch then occurs based on the user's configured redundancy algorithm rules. If the test results indicate that shadow eEDI 1204 does not have good device connectivity, then the primary eEDI 1202 and the shadow eEDI 1204 will take turns controlling the port in an effort to search (e.g., hunt) for connectivity to be re-established.

In an embodiment, a system for enabling control of devices (e.g., Ethernet field devices 104, 316, Serial field devices 106, 318, workstations and controllers 108, etc.) in a process control system (e.g., process control system 100, etc.) includes at least one first interface (e.g., Ethernet interfaces 204, Serial interfaces 206, MESH network interfaces 208, etc.), at least one second interface (e.g., Ethernet interfaces 204, Serial interfaces 206, MESH network interfaces 208, etc.), and a device integrator processor (e.g., processor 118, etc.). The first interface is configured to support communication of first electronic data among the devices via at least one electronic data communications network (e.g., MESH networks 116, Ethernet networks 704, 804-A, 804-B, 806, etc.) according to a first electronic data communication protocol (e.g., Ethernet, MODBUS, RS 232, etc.). The second interface is configured to support communication of second electronic data among the devices via the at least one electronic data communications network according to a second electronic data communication protocol (e.g., Ethernet, MODBUS, RS 232, etc.). The device integrator processor includes a primary module (e.g., primary module 302) and a shadow module (e.g., shadow module 308). The primary module and the shadow module are each configured to couple to the electronic data communications network via the first and second interfaces. The primary module is configured to receive and transmit the first and second electronic data on the electronic data communications network according to the first and second electronic data communication protocols simultaneously. For example, communicating via the plurality of protocols enables the primary module to control communications on the electronic data communication network during operation of the system. The primary module is further configured to synchronize the shadow module with the primary module by communicating the received first and second electronic data to the shadow module. For example, the synchronization enables the shadow module to take over for the primary module in the event the primary module becomes unavailable. Additionally or alternatively, the shadow module is configured to receive and transmit the first and second electronic data according to the first and second electronic data communication protocols simultaneously and further configured to synchronize the primary module therewith by communicating the received first and second electronic data to the primary module.

Figure 13A:
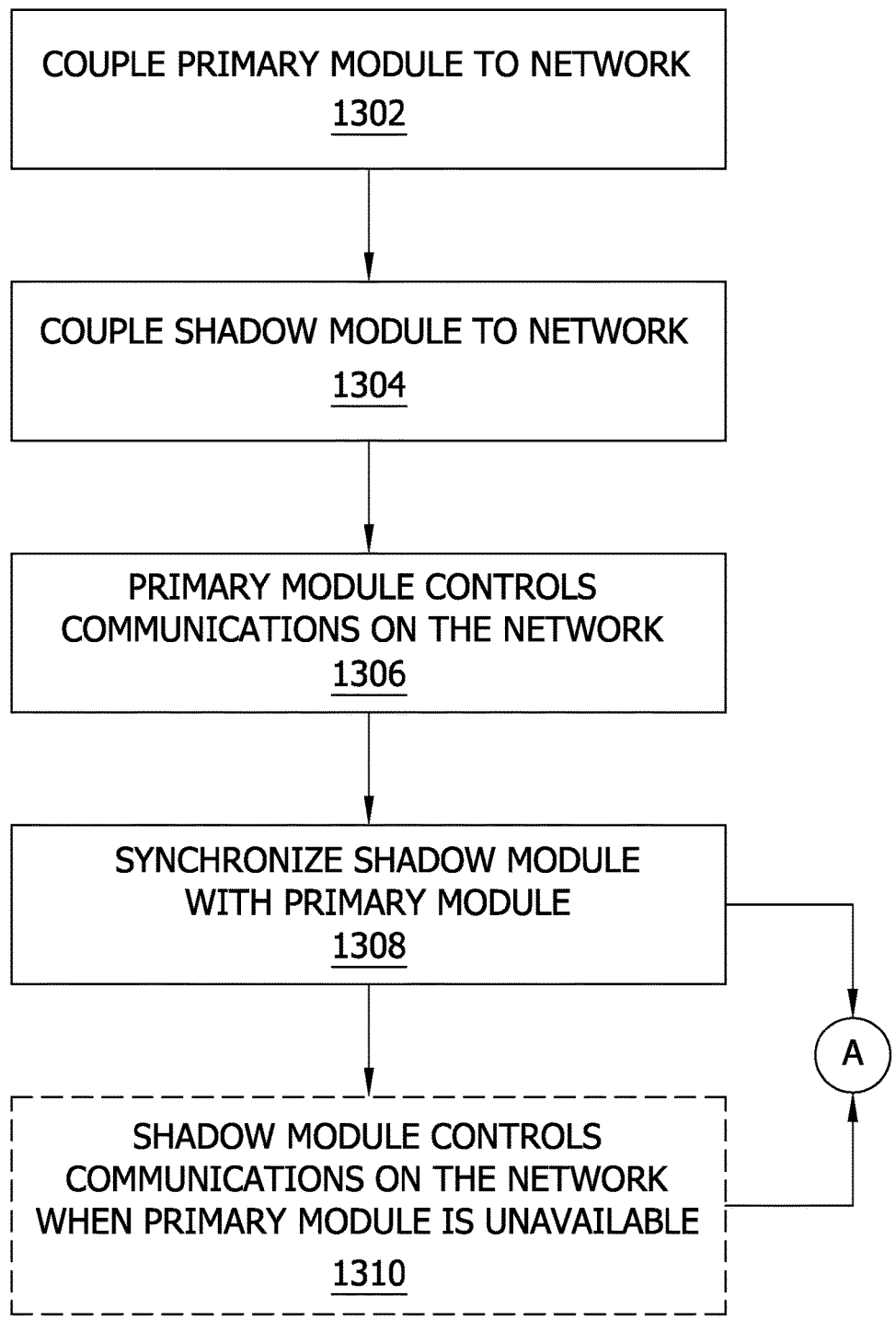
FIGS. 13A and 13B are diagrams of an exemplary method according to an embodiment of the disclosure.
Figure 13B:
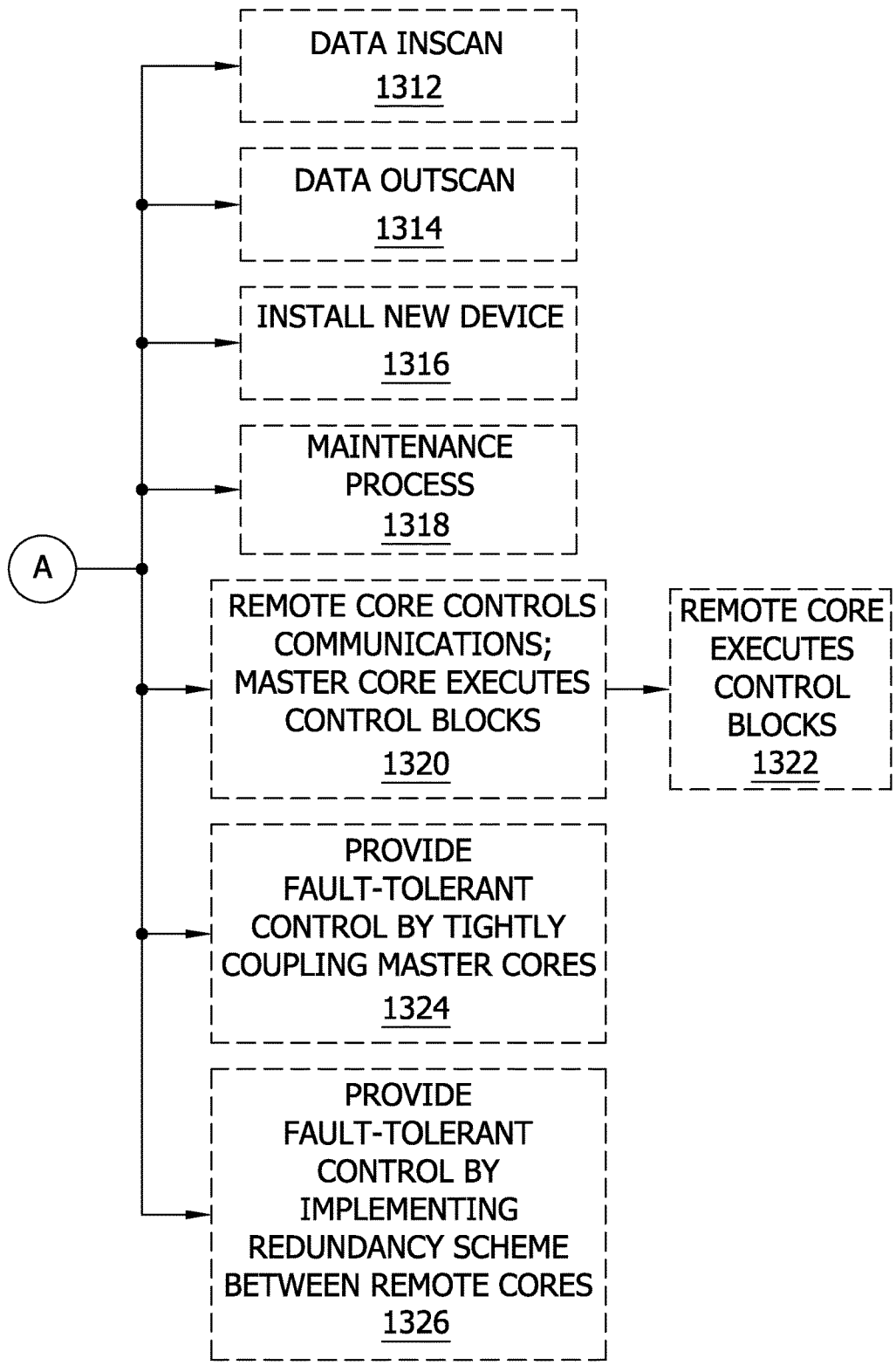

In another embodiment, a method for enabling control of devices (e.g., Ethernet field devices 104, 316, Serial field devices 106, 318, workstations and controllers 108, etc.) in a process control system (e.g., process control system 100, etc.) is provided, as illustrated by FIGS. 13A and 13B. The method includes coupling (1302) a primary module (e.g., primary module 302) of a device integrator processor (e.g., processor 118) to an electronic data communications network (e.g., MESH networks 116, Ethernet networks 704, 804-A, 804-B, 806, etc.) via at least one first interface (e.g., Ethernet interfaces 204, Serial interfaces 206, MESH network interfaces 208, etc.) and at least one second interface (e.g., Ethernet interfaces 204, Serial interfaces 206, MESH network interfaces 208, etc.). The first and second interfaces are configured to simultaneously support communication of first electronic data among the devices via the electronic data communications network according to a first electronic data communication protocol and second electronic data among the devices via the electronic data communications network according to a second electronic data communication protocol. The method includes coupling (1304) a shadow module (e.g., shadow module 308) of the processor to the electronic data communications network via the first and second interfaces. Furthermore, the method controls (1306) communications on the electronic data communications network by the primary module receiving and transmitting the first and second electronic data on the electronic data communications network. And the method includes synchronizing (1308) the shadow module with the primary module by the primary module communicating data it receives to the shadow module. Additionally or alternatively, the shadow module receives and transmits the first and second electronic data on the electronic data communications network and synchronizes the primary module therewith by communication data it receives to the primary module.

Additionally or alternatively, the method may include additional steps as described below. One having ordinary skill in the art will understand that the method may include these additional steps individually or in various combinations thereof.

In one form, the method includes the shadow module utilizing the data received from the primary module to control (1310) communications on the electronic data communications network dynamically in response to the primary module becoming unavailable. In another form, the primary module includes a primary master core (e.g., primary master core 304, etc.) and a primary remote core (e.g., primary remote core 306, etc.) and the method includes one or more of a data inscan process (1312), a data outscan process (1314), installation of a new device (1316), and a maintenance process (1318), as further described herein. In yet another form, the primary module includes a primary master core (e.g., primary master core 304, etc.) and a primary remote core (e.g., primary remote core 306, etc.) and the method includes the primary remote core controlling (1320) communications on the electronic data communications network and the primary master core executing control blocks for controlling operation of the devices. When the primary master core becomes unavailable, the primary remote core executes (1322) the control blocks for controlling operation of the devices. In another form, the primary module includes a primary master core (e.g., primary master core 304, etc.) and the shadow module includes a shadow master core (e.g., shadow master core 310, etc.) and the method includes providing (1324) fault-tolerant control to the devices by tightly coupling the primary master core and the shadow master core. In yet another form, the primary module includes a primary remote core (e.g., primary remote core 306, etc.) and the shadow module includes a shadow remote core (e.g., shadow remote core 312, etc.) and the method includes providing (1326) fault-tolerant control of communications on the electronic data communications network by implementing at least one of a hot-standby redundancy scheme and a single side scan redundancy scheme between the primary remote core and the shadow remote core.

EXAMPLE

Aspects of the disclosure further relate to a multi-protocol gateway with control. This novel gateway provides multiple interfaces to support multiple protocols to a set of external equipment. Advantageously, the gateway provides dynamic capabilities that can execute in parallel.

The gateway is preferably embodied by a Field Device Controller, referred to herein as FDC280. The Field Device Controller 280 (FDC280) is an optionally fault-tolerant controller module configured to provide device integration, including interfacing field devices, accessing data in those devices for display, historization, and performing control tasks. It is further configured to provide communication connectivity to remote field devices that support the Modbus TCP protocol. In operation, the FDC280 physically connects to field devices over, for example, 10/100 Mbps/1 Gbps copper Ethernet via customer-supplied switches. In an embodiment, the FDC280 is certified ISASecure® EDSA Level 1, and uses a host workstation with Foxboro Evo Control Core Services software v9.3 or later, and Foxboro Evo Control Software v6.2 or later. Moreover, the FDC280 is preferably configured to provide the standard capabilities of a Foxboro Evo control processor, such as regulatory, logic, timing, and sequential control internally, and performs data acquisition (via connected devices) and alarm detection/notification. It has a liquid crystal display (LCD) on its faceplate, which displays information such as the letterbug, role (Primary/Shadow/Single), part number, hardware revision information, manufacturing date, and OS version. System engineers can set the FDC280's letterbug using the arrow and <Select> keys on the faceplate. A set of light-emitting diodes (LEDs) provide a visual indication of the communication activity of all of the control network and the Ethernet channels for field device communications. The FDC280 can be installed as simplex (single) or fault-tolerant. If installed as simplex, the FDC280 is installed in the left slot in the FDC280 baseplate.

In an embodiment, the FDC280 provides control processor features, such as:

Supports up to 256 field devices, having up to 8000 I/O points.

Can scan I/O points up to 10 times per second as supported by the foreign device.

Field Device Integration support for Modbus TCP, 10/100 Mbps/1 Gbps on the field device side.

A direct 100 Mbps Ethernet fiber or copper connection to the control network for high speed data communication. Copper cabling is low-cost. Fiber optic cabling is immune to electromagnetic interference over its length.

A fault tolerant option that delivers improved availability and safety using unique, dual controller comparison on all outgoing messages over the Foxboro Evo Control Network, as well as to support redundant operations for monitoring/controlling connected field devices.

Communications with the Foxboro Evo Control Network managed by redundant Fiber or Copper Adapters mounted on the FDC280 baseplate.

Optional self-hosting mode allows the FDC280 to start up and run, executing its configured control scheme using the checkpoint file stored in flash memory. This allows the FDC280 to boot itself with a valid control database even if its host workstation is not present.

Minor image update replaces the executable image of a running, fault-tolerant FDC280 controller with minimal impact to a controlled process.

Optimizes rack space compared to the FCP/FDSI solution.

Alarm Queue size supports up to 20,000 messages.

Optional external time synchronization, supported by a global positioning system available via pulse output from an MTK Spectracom card to the FDC280's baseplate.

Liquid Crystal Display (LCD) and buttons on FDC280 faceplate allow letterbug setting and reading the letterbug, module roles, and real-time statuses.

Improved controller performance. In ideal conditions, the FDC280 can execute 16,000 blocks per second.

Control block processing isolation from device scanners is provided by isolating each activity to an independent processor core within the FDC280's CPU—one core for the FDC280's control software and Foxboro Evo Control Network communications software (Core 1), and one core for communicating with the connected field devices (Core 2). With a fault-tolerant pair of FDC280s, the Core 2 full communication with the field devices is performed by the Primary FDC280, with the Shadow FDC280 doing minimal communication to maintain connection with the devices. A dedicated, memory-based communication channel is provided to allow the Core 1 access to Device configuration and the data managed by Core 2.

For enhanced reliability during maintenance operations, a recessed reset button, located at the front of the module, allows you to manually reset the module without removing it from the baseplate.

Flash memory is guaranteed for the lifetime of the FDC280.

I/O communications support the following data streams:
Real-time I/O.
I/O maintenance activity, such as alarm messages and SMON log messages.

In an embodiment, the gateway comprises a single, multi-core processor that supports control and multiple external devices to provide: dynamic changes of configuration (devices, blocks, control) and communication parameters; execution of full suite of control blocks in parallel with 10/Gateway operations; and logical separation (through multiple cores) of control functions and I/O communications resulting in increased availability and security.

In another embodiment, the gateway permits concurrent communication using multiple protocols over multiple Serial interfaces and an Ethernet interface, including wireless communications.

The gateway embodying aspects of the present invention also permits multiple Ethernet protocols running in parallel on the same physical interface.

In yet another embodiment, the gateway provides high availability for all configurations by providing highly available, redundant configurations for these protocols running in parallel. By combining these communication interfaces into a single module, the user has simpler installation and checkout for communications to external devices. The cost and footprint of the solution are lowered.

And in yet another embodiment, the gateway permits online upgrade for a Station (e.g., to replace or update drivers) without losing communications to external devices for more than one control cycle.

The aforementioned functions may be executed separately or in parallel.

The gateway according to embodiments of the invention advantageously provides significant benefits. For instance, this module replaces two separate modules in a conventional system, namely, a controller and multiple Fieldbus modules (FBMs). It further consolidates Serial and Ethernet communications into a single module. Previously separate types of FBMs were required. This reduces cost, amount of spares required at the customer site and system footprint. In addition, this module supports multiple protocols simultaneously and allows the dynamic download of patches to drivers and new types of drivers while allowing other communications to run without interruption. In a conventional system, changes to the drivers would require more downtime to shut down the other communication interfaces. Moreover, Logical separation (through multiple cores) of control functions and I/O communications result in increased availability and security.

In contrast, conventional technology would require the combination of a control processor, such as an FCP280, with multiple FBMs, such as FBM231 and FBM233, with all of the baseplates and interconnecting cables. And, the work to configure the system is simpler because the FBM layer does not exist and maintenance is simpler because the number of modules to update and repair is reduced.

As described above, the gateway according to aspects of the invention provides a multi-core processor that supports dynamic configuration changes. The following describes configuration procedures of a Modbus TCP Client Driver embodying aspects of the invention. For example, the driver is suitable for a Field Device Controller, referred to as FDC280.

Configuration Procedures

Each protocol driver uses one configured Equipment Control Block (ECB). For each device associated with the FDC280, a child ECB201 is configured and connected to the (parent) ECB200. A Distributed Control Interface (DCI) block is configured for each I/O point in the device that needs to be accessed by the FDC280. The DCI blocks can be configured anywhere in the Continuous List hierarchy (List 1 or 2), in any compound in a control processor (except the ECB compound and station compound).

Figure 14:
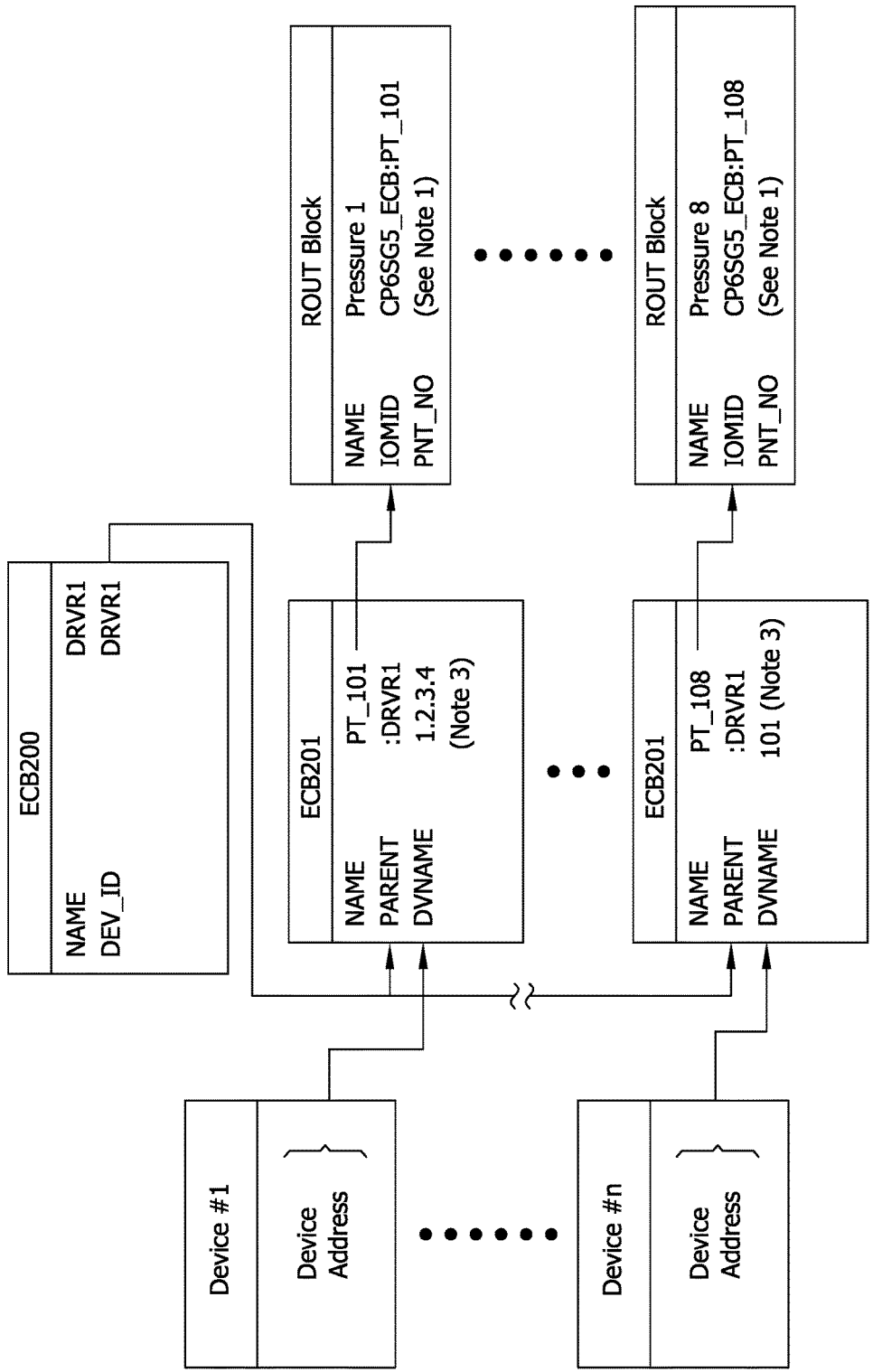
FIG. 14 is an exemplary Modbus block interconnections diagram.

FIG. 14 illustrates exemplary Modbus block interconnections for ECB200 and ECB201. FIG. 14 shows the user-configured connections between the various elements of a typical control scheme using FDC280. In this figure, a ROUT block is used to process a real output value directed to the field devices.

Configuration for other types of device parameters and corresponding DCI blocks is similar, with similar interconnections between the ECBs and DCI blocks.

Regarding FIG. 14:
A DCI block (such as Real In (RIN) or Real Out (ROUT), where Real indicates a floating point value) is configured and connected to the device's ECB201 for each value to be read from or written to the device by the control processor.

Certain DCI block parameters (such as PNT_NO and INI_PT) are encoded with a data identifier to enable the FDC280 to identify specific data in the I/O data stream. DVNAME contains the user-configured IP address of the associated device.

When modifying an ECB201 configuration with changes that are related to DCI connections (for example, when changing a device address), preferably monitor the ECB201 block detailed display while modifying the ECB201 configuration. This ensures that all possible errors are detected (and resolved) before commencement of process control operations.

In an aspect, a set of one or more procedures guide the user through the control configuration process for the FDC280, using the Control Editors. Via the Control Editors (e.g., graphical user interfaces displayed on a computing device, etc.), the user can install drivers and/or import driver definition files, configure the FDC280, configure the FDC280's drivers (e.g., driver description, driver properties, etc.), create and/or edit the FDC280 equipment control block (ECB) for Ethernet devices, configure custom parameters to customize the behavior of the FDC280 driver, and configure the FDC280's field device objects.

In an aspect, the FDC280 supports two methods of determining to which of the redundant FDC280s to give control in the event of a failover. A first method, which may be implemented by setting a redundancy algorithm entry to "ALG=0" in an embodiment, automatically performs a failover if the Shadow FDC280 has good connectivity to all devices that the Primary FDC280 has marked as running without issues, and the Shadow FDC280 has good connectivity to one or more devices that the Primary FDC280 has marked as failed. If there are connection failures in both Primary and Shadow FDC280s for differing sets of devices, this redundancy algorithm does not initiate a failover. In an embodiment, this first method is used by default. A second method, which may be implemented by setting the redundancy algorithm entry to "ALG=1" in an embodiment, performs a failover when the Shadow FDC280 has more good connected devices than the Primary FDC280. This second method gives control to the FDC280 with the higher count of "good" connected devices. This algorithm is preferably used when all devices have equal importance to the user.

As described above, the gateway according to aspects of the invention provides concurrent communication using multiple protocols over multiple Serial interfaces and an Ethernet interface. Moreover, the gateway permits multiple Ethernet protocols to run in parallel on the same physical interface.

Configuring DCI Blocks

In a control strategy, the DCI control blocks interface the Foxboro Evo system to the field devices. As part of the editing operations performed on the newly created DCI blocks, certain parameters (PNT_NO, R11_PT and others) must contain a point address to specify the particular point to be accessed regarding the input or output data handled by the DCI block. In conjunction with creating and editing DCI blocks, the user configures the various blocks and compounds required for the desired control scheme. The engineering units configured for the block detail display match the units configured in the device.

As described above, the gateway according to aspects of the invention provides execution of full suite a control blocks in parallel with I/O Gateway operations. In addition, in an embodiment, the gateway permits logical separation (through multiple cores) of control functions and I/O communications resulting in increased availability and security.

DCI Block Processing

The following is an overview of DCI block processing (and data read/write) operations. The FDC280 processes the ECBs and DCI blocks as an integral part of its compound processing each Basic Processing Cycle (BPC). The order of processing is the same as the order of the compounds, ECBs, and blocks configured in the control database. Processing of the ECBs and control blocks is performed in the following sequence:

1. Scheduling of a control block depends on its Period and Phase parameter settings. It is the user's responsibility to synchronize (if required) the associated ECB and control block processing by configuring these parameters appropriately.
2. ECBs scheduled to be processed are executed to read fresh inputs: When a parent or child ECB is processed, its list of DCI blocks is examined. For each DCI input or output block ready to be run in that BPC, its DCI connection requests are added to a read list for that ECB. When the read list is complete, data is collected from Core 2 to populate the DCI Connection records. Note that Core 2 manages the input data asynchronously and independently of Core 1, according to the configured I/O scan time. All read list data is moved into the DCI connection records in the DCI blocks as data is retrieved.
3. Control blocks scheduled to be processed are executed: When all ECBs have been processed, the control blocks are processed. When the DCI blocks are processed, all DCI connection data is processed. During this processing, the DCI blocks set write request flags in the DCI connection records for any outputs that need to be written to the field devices.
4. ECBs scheduled to be processed, and containing fresh outputs to be written, are executed: When all control blocks have been processed, the ECBs are processed once again to drive the field outputs (in the control output blocks) that have been changed in that BPC. When a DCI parent or child ECB is processed, its list of blocks is examined once again. For each DCI connection record with a pending write request flag, a write list is generated. When the write list is complete, data is moved to a Core 2 output buffer and immediately (within 100 milliseconds) written to the corresponding device(s). (If necessary, multiple messages are used to write all data requested by the DCI blocks for that BPC.)

Key DCI Block Functions

Some key DCI block functions that can be selected by parameter settings include: periodic/change-driven DCI block execution, auto/manual mode of operation, simulation mode, signal conditioning and linear scaling of analog inputs/outputs, limiting/constraining input values by the engineering range configured in the DCI block, confirming block outputs by a readback of the actual value read from the field, clamping/constraining output values by limit values configured in the block, initializing block output values to the value read back from the field, cascading logic initialization, and preconfiguring selection options for redundant input values.

Principles of Operation

The following provides an overview of the operation of the Modbus driver interfacing a Foxboro Evo system to Modbus devices. After the user configures the appropriate DCI blocks and ECBs using a control configurator, enable device communication from the System Manager for each Modbus device connected. The Modbus TCP Client/master driver sends scan messages. The FDC280 waits for responses from the device, processes the responses, and updates DCI blocks mapped to the I/O points. The following section describes the operation of fault-tolerant FDC280s interfacing to Modbus devices using redundant connections.

As described above, the gateway according to aspects of the invention permits high availability for all configurations.

Education of a New Shadow FDC280

If only a single FDC280 is plugged in the baseplate or if one of the two FDC280s is present but defective, the single working module operates as a Primary module. When a replacement second FDC280 is plugged in the baseplate, the current Primary FDC280 "educates" the new Shadow FDC280. While the education process is ongoing, data continues to flow from the devices to the Primary FDC280. Once the Shadow FDC280's education is complete, it goes online and the two modules marry as described above. The Shadow FDC280's education process may take several minutes to complete. This duration depends on several factors, such as the number of DCI blocks to be added, or the number of devices. Role switch requests from System Manager are not honored while the Shadow FDC280 education process is ongoing. A yellow triangle (warning condition) appears in the System Manager for the Shadow FDC280 while the education process is occurring. After the Shadow FDC280's education is completed successfully, the message "Shadow Education Completed" is sent to SMON log.

As described above, the gateway according to aspects of the invention provides online upgrade for station without losing communications to external devices for more than one control cycle.

Minor Image Update

For a fault tolerant FDC280, a Minor Image Update replaces the executable image (operating system) of a running FDC280 with a newer image without having to shut down the equipment being controlled by the FDC280. This feature allows the user to take advantage of many product enhancements while only pausing control for less than 0.5 seconds with I/O scanning failover within 2.5 seconds plus scan time. This has the same process effect as a failover operation to the Shadow FDC280. Only one active network interface is required for an Image Update to occur. In an embodiment, each FDC280 baseplate has two fiber or copper adapters, but only one is required to have connectivity for a Minor Image Update. The Minor Image Update can be performed at any time as the only process effect is a normal failover after the new image is installed in the Shadow module. This update is intended to allow minor changes to be installed safely and with minimal process effects.

The Minor Image Update is an image update during which each FDC280 in a fault-tolerant pair is taken offline separately and updated with the new image. It typically provides defect corrections and has the same effect on the process as a failover. A Minor Image Update for an unmarried FDC280 has the same control effect as a full reboot of the Single Primary module or, if fault-tolerant, of the two FDC280s in the fault-tolerant pair.

Minor Image Update for Married Stations

This following describes the System Manager procedures to perform a Minor Image Update of a fault-tolerant FDC280 whose modules are currently married, and the sequence of system events required for the update. A Minor Image Update for a married fault-tolerant FDC280 has the same effect as a fault-tolerant failover, meaning control is paused for up to 500 milliseconds. Additionally, I/O updates are paused for up to two seconds.

In an embodiment, the Minor Image Update performs the following. The Shadow FDC280 is placed off-line, updated to its new image, and rebooted. If comparison of the current and new FDC280 revisions indicate that a Major Image Update is needed (e.g., if any of the first seven digits of the version string differ, etc.), the Minor Image Update is aborted and messages are sent to a SMON log indicating the update was rejected. The Primary FDC280 switches to Single mode (instead of Fault-Tolerant). The new image is written to the Shadow FDC280. The Shadow FDC280 reboots and performs verification that the version indicates a Minor Image Update. If it is not a Minor Image Update, it is rejected and a message is sent to the System Manager that the update could not be performed. If rejected, the modules will return to married operation running the old image. If verified successfully, the Primary FDC280 and Shadow FDC280 marry normally. The FDC280 running the new image performs initialization for its Core 2 CPU. When the initialization is complete, a message is sent indicating "Shadow ready for takeover". The Primary FDC280 and Shadow FDC280 then operate in the same manner as any other marriage scenario with the Shadow FDC280 going through an "education" process where it configures and reforms all connections to the I/O while the Primary FDC280 maintains control. The System Manager log displays a message that the FDC280 modules are ready for image activation. Also, an indication in the Device Driver ECB of a Minor Image Update in progress is displayed in the same log. If the "Auto" mode is selected, the image update completes automatically by rebooting the module running the older image and performing a failover to the module running the new image. If the "Manual" mode is selected, the operator may now initiate a switch to the new image with a standard "Reboot Primary" command from the System Manager. Rebooting the Primary FDC280 results in the Shadow FDC280 assuming control with the new Minor image behavior. The module with the old image reboots, copies the new Minor version of software, and then marries normally.

The Primary FDC280 reboots in the same manner as it would for a failover, while the Shadow FDC280 takes over from the current control state. In an embodiment, the total process completes in less than two minutes after the remarriage operation. There is no difference in process effects from a Minor Image Update to a "normal" failover sequence (where the Shadow module becomes the Primary due to operator command or hardware fault). A Minor Image Update can be reversed by simply re-installing the previous image and performing another Minor Image Update.

Minor Image Update for Unmarried Stations

Typically, an FDC280 module configured for fault-tolerant operation would have a pair of married modules running at the time of a Minor Image Update. If for whatever reason, the FDC280 does not have a pair of married modules running, a Minor Image Update can still be requested. However, it will have the effect of a Major Image Update.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the software aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the software aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the following description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and process without departing from the scope of aspects of the disclosure. In the preceding specification, various preferred embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A system for enabling control of devices in a process control system, comprising:
   at least one first interface configured to support communication of first electronic data among the devices via at least one electronic data communications network according to a first electronic data communication protocol;
   at least one second interface configured to support communication of second electronic data among the devices via the at least one electronic data communications network according to a second electronic data communication protocol; and a device integrator processor, said processor comprising a primary module and a shadow module, the primary module and the shadow module each configured to couple to the electronic data communications network via the first and second interfaces, the primary processor module including a primary master core assigned to communicate with a first set of devices and a primary remote core assigned to communicate with a second set of devices, the shadow processor module including a shadow master core and a shadow remote core, each master core of the primary and shadow processor modules being related via a redundancy scheme and each remote core of the primary and shadow processor modules being related via a redundancy scheme that is different than the redundancy scheme between the primary master core and the shadow master core, the redundancy scheme between the primary master core and the shadow master core comprising tightly coupling the primary master core and the shadow master core to provide fault tolerant control to the devices, and the primary module configured to receive and transmit the first and second electronic data on the electronic data communications network according to the first and second electronic data communication protocols simultaneously to control communications on the electronic data communication network during operation of the system.

2. The system of claim 1, wherein at least one of the primary module and the shadow module is further configured to synchronize the other module therewith by communicating the received first and second electronic data to the other module.

3. The system of claim 1, wherein the first electronic data communication protocol is at least one of a MODBUS protocol, an Ethernet protocol, and a serial protocol and wherein the second electronic data communication protocol is at least one of a MODBUS protocol, an Ethernet protocol, and a serial protocol.

4. The system of claim 1, wherein at least one of:
the first electronic data communication protocol comprises a plurality of instances of an Ethernet protocol, wherein the primary module is configured to receive and transmit the first electronic data on the electronic data communications network according to the plurality of instances of the Ethernet protocol via the first interface; and
the second electronic data communication protocol comprises the plurality of instances of the Ethernet protocol, wherein the primary module is configured to receive and transmit the second electronic data on the electronic data communications network according to the plurality of instances of the Ethernet protocol via the second interface.

5. The system of claim 1, wherein the shadow module is configured to dynamically begin controlling communications on the electronic data communications network by utilizing the data received from the primary module when the primary module becomes unavailable during operation of the system.

6. The system of claim 1, wherein the primary module is configured to control communications on the electronic data communications network among the first subset of the devices by receiving and transmitting the first electronic data according to the first electronic data communication protocol via the first interface, and wherein the shadow module is configured to simultaneously control communications on the electronic data communications network among the second subset of the devices by receiving and transmitting the second electronic data according to the second electronic data communication protocol via the second interface.

7. The system of claim 1, wherein the primary master core is configured to execute one or more control blocks for controlling operation of the devices during operation of the system, and wherein the primary remote core is configured to control the communications on the electronic data communications network during operation of the system.

8. The system of claim 7, wherein the primary remote core is configured to dynamically begin controlling operation of the devices when the primary master core becomes unavailable during operation of the system.

9. The system of claim 1, wherein the primary remote core and the shadow remote core implement at least one of a hot-standby redundancy scheme and a single side scan redundancy scheme to provide fault tolerant control of communications on the electronic data communications network.

10. A method for enabling control of devices in a process control system, said method comprising:
coupling a primary module of a device integrator processor to an electronic data communications network via at least one first interface and at least one second interface, the first and second interfaces configured to simultaneously support communication of first electronic data among the devices via the electronic data communications network according to a first electronic data communication protocol and second electronic data among the devices via the electronic data communications network according to a second electronic data communication protocol, the primary processor module including a primary master core assigned to communicate with a first set of devices and a primary remote core assigned to communicate with a second set of devices;
coupling a shadow module of the processor to the electronic data communications network via the first and second interfaces, the shadow processor module including a shadow master core and a shadow remote core, each master core of the primary and shadow processor modules being related via a redundancy scheme and each remote core of the primary and shadow processor modules being related via a redundancy scheme that is different than the redundancy scheme between the primary master core and the shadow master core, the redundancy scheme between the primary master core and the shadow master core comprising tightly coupling the primary master core and the shadow master core to provide fault tolerant control to the devices; and
controlling communications on the electronic data communications network by the primary module receiving and transmitting the first and second electronic data on the electronic data communications network.

11. The method of claim 10, further comprising synchronizing the primary module and the shadow module by at least one of the primary module and the shadow module communicating the received first and second electronic data to the other module.

12. The method of claim 10, further comprising controlling, by the shadow module utilizing the data received from the primary module, communications on the electronic data communications network dynamically in response to the primary module becoming unavailable.

13. The method of claim 10, wherein the primary module includes a primary master core and a primary remote core, the method further comprising:
pausing, by the primary remote core, scan updates of the first and second electronic data received from the devices via the electronic data communications network to a device input table of a shared memory device;
reading, by the primary master core, the stored electronic data from the device input table; and
installing, by the primary master core, the electronic data read from the device input table into control blocks executing thereon.

14. The method of claim 10, further comprising:
executing, by the primary master core, an outscan of output data representative of an updated operation state of the devices;
writing, by the primary master core, the output data to a shared memory device;
reading, by the primary remote core, the output data from the shared memory device; and
transmitting, by the primary remote core, the read output data to the devices via the electronic data communications network,
wherein said transmitting causes the devices to operate at the updated operation state thereof represented by the transmitted output data.

15. The method of claim 10, further comprising:
obtaining, by a maintenance process executing on the primary master core in response to connection of a new device on the electronic data communications network, device data for the new device from a device host;
instructing, by the maintenance process executing on the primary master core, the primary remote core to install the new device by a driver control task;
writing, by the maintenance process executing on the primary master core, the device data to a shared device configuration table in a memory device; and
reading, by the driver control task executing on the primary remote core, the device data from the shared device configuration table to install the new device.

16. The method of claim 10, further comprising:
instructing, by the primary master core, the primary remote core to read a device status of at least one of the devices;
reading, by the primary remote core in response to said instructing, the device status of the device;
writing, by the primary remote core in response to said reading, the device status to a shared operational data table in a memory device;
reading, by the primary master core in response to said writing, the device status from the shared operational data table in the memory device;
executing, by the primary master core in response to said reading, one or more control blocks to generate output data values representative of an updated operation state of the devices;
writing, by the primary master core in response to said executing, the output data values to the shared operational data table in the memory device;
reading, by the primary remote core, the output data values from the shared operational data table in the memory device; and
distributing, by the primary remote core in response to said reading, the output data values to the at least one device.

17. The method of claim 10, wherein said controlling communications on the electronic data communications network comprises the primary remote core receiving and transmitting the first and second electronic data on the electronic data communications network, said method further comprising executing, by the primary master core, one or more control blocks for controlling operation of the devices.

18. The method of claim 17, further comprising executing, by the primary remote core, the one or more control blocks for controlling operation of the devices dynamically in response to the primary master core becoming unavailable.

19. The method of claim 10, further comprising further comprising implementing as the redundancy scheme between the primary remote core and the shadow remote core at least one of a hot-standby redundancy scheme and a single side scan redundancy scheme between the primary remote core and the shadow remote core.

* * * * *